(12) United States Patent
Mizuno

(10) Patent No.: US 7,940,991 B2
(45) Date of Patent: May 10, 2011

(54) IMAGE SIGNAL PROCESSING APPARATUS

(75) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1045 days.

(21) Appl. No.: 11/697,875

(22) Filed: Apr. 9, 2007

(65) Prior Publication Data

US 2007/0237411 A1 Oct. 11, 2007

(30) Foreign Application Priority Data

Apr. 10, 2006 (JP) ................................. 2006-107347

(51) Int. Cl.
*G06K 9/46* (2006.01)

(52) U.S. Cl. ........ 382/240; 382/232; 382/226; 382/224; 375/240.19; 341/79

(58) Field of Classification Search .................. 382/232, 382/240, 226, 224; 375/240.19; 341/79
See application file for complete search history.

(56) References Cited

U.S. PATENT DOCUMENTS

| | | | | |
|---|---|---|---|---|
| 7,355,755 | B2 * | 4/2008 | Suino et al. ................... | 358/3.15 |
| 7,423,781 | B2 * | 9/2008 | Morimoto et al. ............. | 358/2.1 |
| 2003/0002734 | A1 * | 1/2003 | Islam et al. .................... | 382/166 |
| 2003/0063804 | A1 * | 4/2003 | Henry ........................... | 382/232 |

FOREIGN PATENT DOCUMENTS

| | | |
|---|---|---|
| JP | 2002-369202 | 12/2002 |
| JP | 2003-324613 | 11/2003 |
| JP | 2004-253889 | 9/2004 |

OTHER PUBLICATIONS

"Information Technology-JPEG 2000 Image Coding System: Core Coding System", International Standard ISO/IEC 15444-1 ITU-T Recommendation, Aug. 2002, 106 Pages.

Sadayasu Ono, et al. "Simple Technique of JPEG2000 (Wakariyasui JPEG 2000 No Gijyutsu)", (with Partial English Translation) pp. 77-80.

Japanese Office Action (with partial English translation), issued on Jan. 5, 2011, in Japanese Patent Application No. 2006-107347 (5 pages).

\* cited by examiner

*Primary Examiner* — Samir A Ahmed
*Assistant Examiner* — Ali Bayat
(74) *Attorney, Agent, or Firm* — Oblon, Spivak, McClelland, Maier & Neustadt, L.L.P.

(57) ABSTRACT

Reference grid information is supplied from a tiling unit to an order control unit. The order control unit generates three control signals on the basis of the reference grid information and outputs them. The first control signal is a signal for controlling the execution order of a vertical low-pass filter and a vertical high-pass filter. The second control signal is a signal for controlling the execution order of a horizontal low-pass filter and a horizontal high-pass filter. The third control signal is a signal for controlling the execution order of a horizontal low-pass filter and a horizontal high-pass filter.

8 Claims, 20 Drawing Sheets

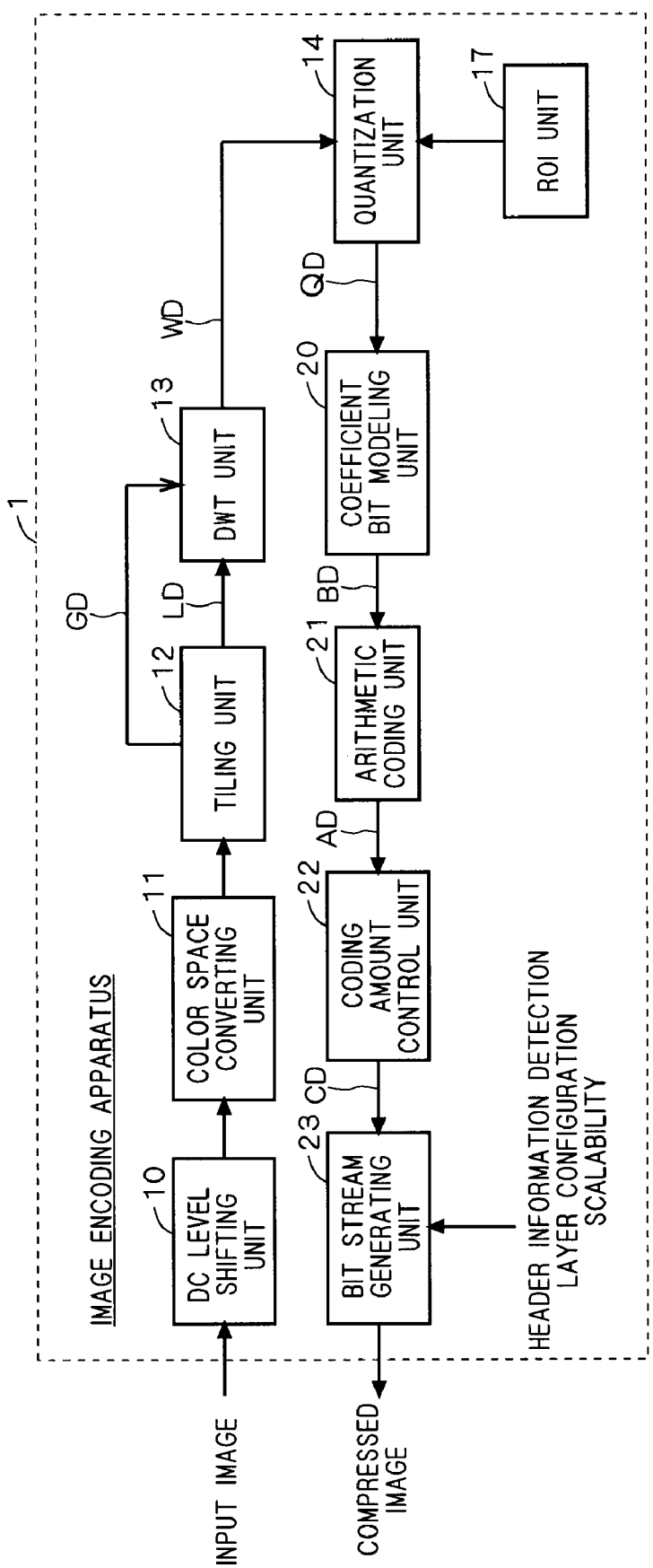

F I G . 4
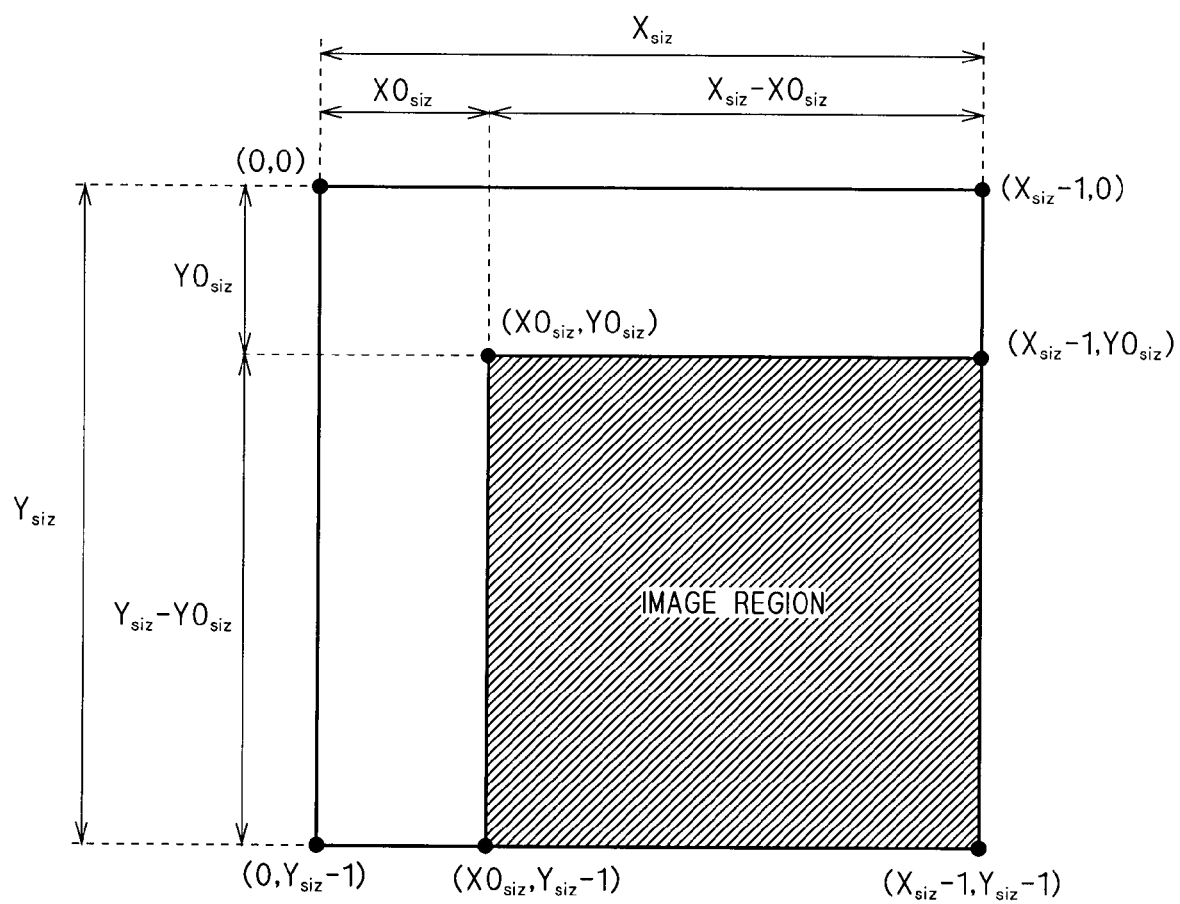

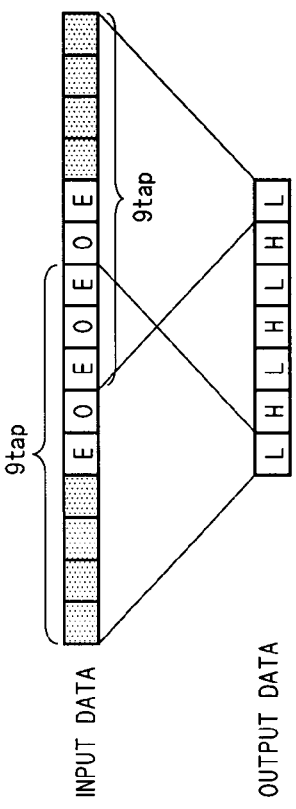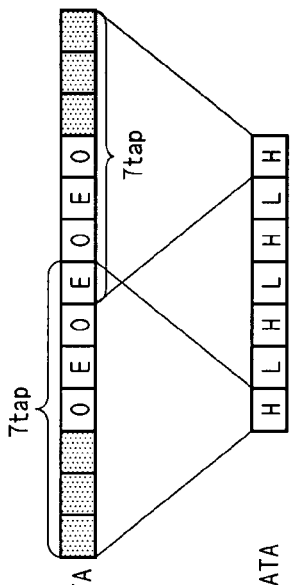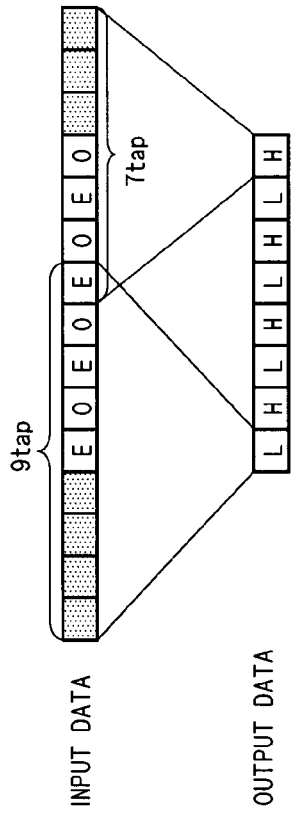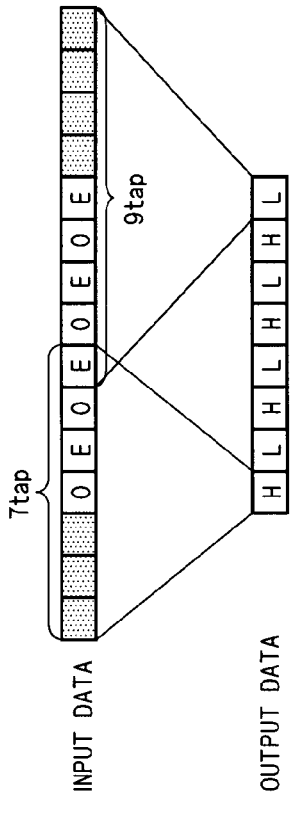

F I G . 1 3
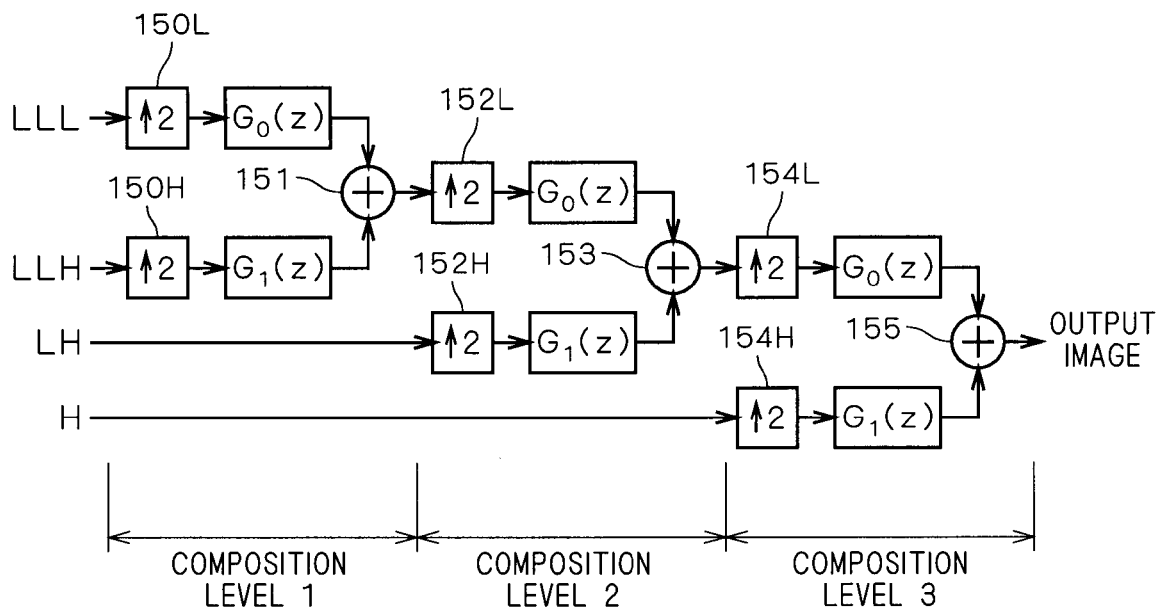

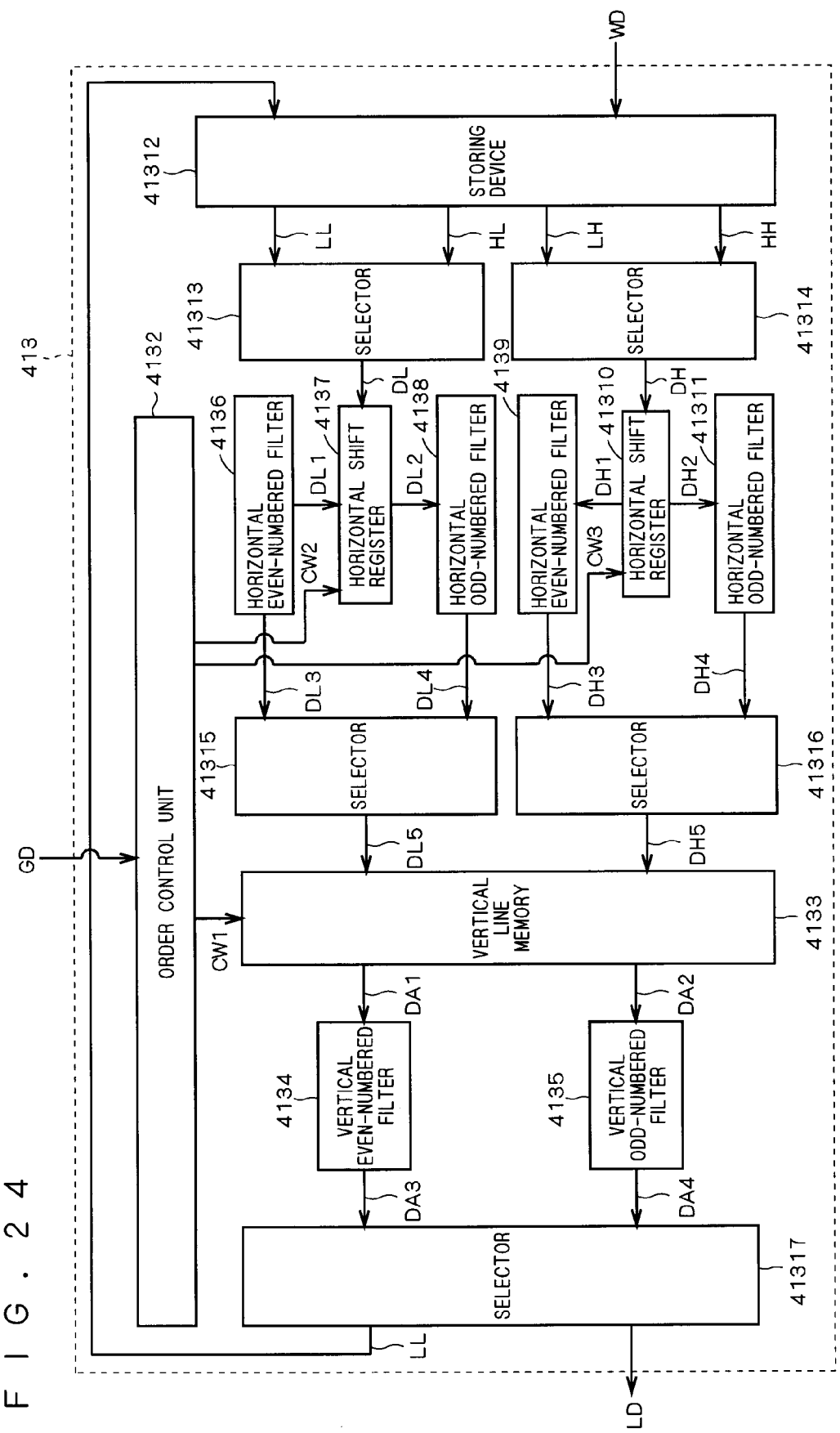
F I G . 2 4

IMAGE SIGNAL PROCESSING APPARATUS

BACKGROUND OF THE INVENTION

1. Field of the Invention

The present invention relates to an image signal processing apparatus and, more particularly, to an image encoding apparatus having a wavelet transforming unit, and an image decoding apparatus having an inverse wavelet transforming unit.

2. Description of the Background Art

In an image encoding apparatus of the JPEG 2000 system, by performing a DC level shifting process and a color space converting process, a two-dimensional image signal is obtained. To extract a desired image region from the two-dimensional image signals, a coordinate system called a reference grid is used. Concretely, by designating offset values in the row and column directions from the origin of the reference grid, a desired image region is specified.

In the JPEG 2000 system, in DWT, the order of processes of using a vertical filter first, and then a horizontal filter is determined. FIG. 9 is a diagram showing a state where a two-dimensional filter is applied on signals of a two-dimensional image of 16 rows and 16 columns in order of a vertical filter and a horizontal filter. The left part shows a state after the vertical filter is applied, and the right part shows a state after the horizontal filter is applied after that.

As shown in the left part of FIG. 9, by applying the vertical filter, vertical components in even-numbered rows become low-pass data L, and vertical components in odd-numbered rows become high-pass data H. As shown in the right part of FIG. 9, by further applying the horizontal filter, horizontal components in even-numbered columns become low-pass data L, and horizontal components in odd-numbered columns become high-pass data H. In the right part in FIG. 9, (LL) shows that both of the horizontal and vertical components are L, (HL) shows that the horizontal component is H and the vertical component is L, (LH) shows that the horizontal component is L and the vertical component is H, and (HH) indicates that both of the horizontal and vertical components are H. The arrow X indicates the vertical direction, and the arrow Y indicates the horizontal direction.

In the case where an offset value from the reference grid is not designated, a process starts from the origin of the reference grid (the left upper corner of the two-dimensional image signal). In this case, an input/output process is executed in order of a low-pass filter and a high-pass filter in each of the vertical and horizontal filters. On the other hand, when the offset value from the reference grid is designated to an arbitrary value, the low-pass filter is not always executed first in each of the vertical and horizontal filters. According to the designated offset value, the order of executing input/output of the low-pass filter and the high-pass filter has to be controlled.

SUMMARY OF THE INVENTION

The present invention is directed to an image signal processing apparatus including a wavelet transforming unit for generating a transform coefficient by recursively splitting image signals to a plurality of high-pass and low-pass components by wavelet transformation.

According to the present invention, the wavelet transforming unit of the image signal processing apparatus has: a vertical filter and a horizontal filter each having a low-pass filter and a high-pass filer; and a control unit for variably controlling an execution order of outputs of the low-pass filter and the high-pass filter in each of the vertical and horizontal filters.

The execution order of outputs of the low-pass filter and the high-pass filter can be controlled according to a designated offset value from the reference grid, and coding of an image signal can be executed while designating the offset value from the reference grid to an arbitrary value.

The present invention is also directed to an image signal processing apparatus including an inverse wavelet transforming unit for generating an image signal by recursively combining a transform coefficient which is split to a plurality of high-pass and low-pass components by inverse wavelet transformation.

According to the present invention, the inverse wavelet transforming unit includes: a horizontal filter and a vertical filter each having a low-pass filter and a high-pass filer; and a control unit for variably controlling an execution order of inputs of the low-pass filter and the high-pass filter in each of the horizontal and vertical filters.

The execution order of inputs of the low-pass filter and the high-pass filter can be controlled according to a designated offset value from the reference grid, and decoding of an image signal in which the offset value from the reference grid is designated to an arbitrary value can be performed.

Therefore, an object of the present invention is to provide an image signal processing apparatus capable of controlling the execution order of inputs/outputs of a low-pass filter and a high-pass filter in accordance with a designated offset value from a reference grid with respect to each of a vertical filter and a horizontal filter.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram showing the configuration of an image encoding apparatus according to a first embodiment of the invention.

FIG. 4 is a diagram showing parameters necessary to define a reference grid.

FIGS. 8A to 8D are diagrams showing the positional relations of input/output data in the case of executing the DWT using a filter of 9×7 taps.

FIG. 13 is a diagram showing a composition-side filter bank.

FIG. 24 is a block diagram showing a concrete configuration of the reverse DWT unit realizing the line-based wavelet transform.

DESCRIPTION OF THE PREFERRED EMBODIMENTS

First Embodiment

Outline of General Apparatus

Figure 2:
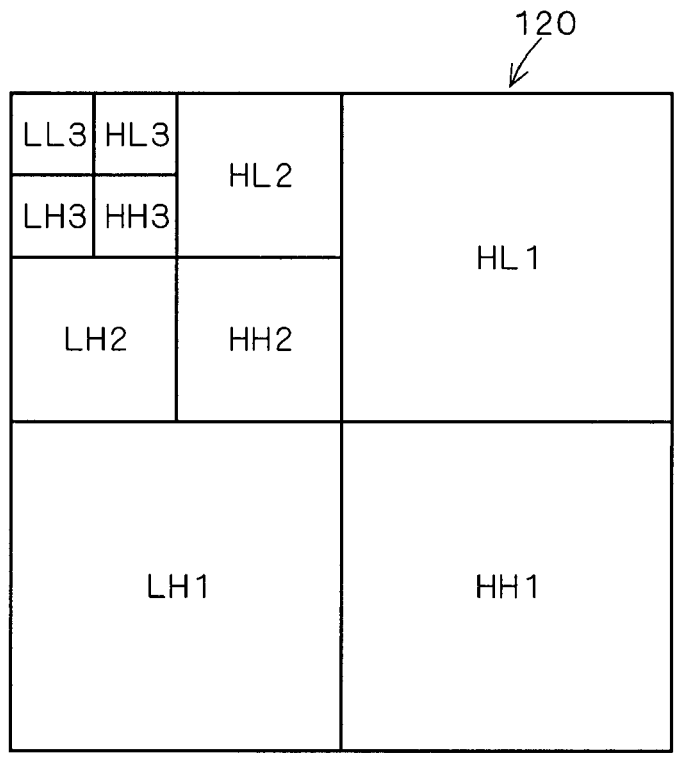
FIG. 2 is a diagram showing a two-dimensional image subjected to DWT of a decomposition level "3" in accordance with the octave band portioning scheme.

FIG. 1 is a functional block diagram showing the configuration of an image encoding apparatus 1 conformed with the JPEG 2000 system, as a first embodiment of the invention. As shown in FIG. 1, the image encoding apparatus 1 has a DC level shifting unit 10, a color space converting unit 11, a tiling unit 12, a DWT unit 13, a quantization unit 14, an ROI unit 17, a coefficient bit modeling unit 20, an arithmetic coding unit 21, a coding amount control unit 22, and a bit stream generating unit 23.

All or part of the processing units 10 to 14, 17, and 20 to 23 constructing the image encoding apparatus 1 may be constructed by hardware or a program for making a microprocessor function.

The DC level shifting unit 10 performs a DC level shifting process as necessary on an image signal (an input image in FIG. 1) supplied to the image encoding apparatus 1 from the outside.

The color space converting unit 11 performs a predetermined color space converting process on the image signal input from the DC level shifting unit 10. According to the JPEG 2000 compression technique, for the color space converting process, RCT (Reversible Component Transformation) and ICT (Irreversible Component Transformation) are prepared and one of them can be properly selected. By the process, for example, an RGB signal input to the color space converting unit 11 is converted to a YCbCr signal or YUV signal.

The tiling unit 12 divides the image signal input from the color space converting unit 11 to a plurality of small rectangular regions called "tiles" by a tiling process. The tiling process is not always necessary and image signals of one frame may be output as they are to the function block at the next stage. In the present invention, a case of processing image signals of one frame as one tile and a process of dividing the image signals to a small number of tiles each having a relatively large size to avoid or suppress occurrence of tile distortion are assumed. The present invention can be also applied to an apparatus in which a normal tiling process is performed.

The tiling unit 12 also performs a process on the reference grid. Specifically, to extract a desired image region from the two-dimensional image signals input from the color space converting unit 11, offset values in the row and column directions with respect to the origin of the reference grid are designated, and information of the offset values is output as reference grid information GD from the tiling unit 12. As described above, the tiling unit 12 also functions as an image region setting unit for setting a predetermined image region on the reference grid by designating the offset values from the origin of the reference grid. The process with the reference grid in the tiling unit 12 will be described in detail later.

The DWT unit 13 performs integer-type or real-type DWT on the tile unit basis on an image signal LD input from the tiling unit 12 and outputs a transform coefficient WD obtained as a result. In the DWT, a one-dimensional filter for dividing a two-dimensional image signal to a high frequency component and a low frequency component is applied in both of the vertical and horizontal directions. Concretely, in the real-type DWT, a filter of 9×7 taps, 5×3 taps, 7×5 taps, or the like is used. In the integer-type DWT, a filter of 5×3 taps, 13×7 taps, or the like is used. The filtering processes may be executed by convolution or the lifting scheme which is more efficient than the convolution.

In the JPEG 2000 system, so-called octave band splitting scheme of recursively splitting only a band component divided to the low frequency side with respect to both of the vertical and horizontal directions is employed. The number of recursive splitting operation times is called a decomposition level.

FIG. 2 is a schematic diagram showing a two-dimensional image 120 subjected to DWT of the decomposition level "3" in accordance with the octave band splitting scheme. At decomposition level "1", by sequentially applying the one-dimensional filter in the vertical direction and the horizontal direction, the two-dimensional image 120 is split into four band components (sub bands) of HH1, HL1, LH1, and LL1 (not shown). "H" denotes a high-pass component, and "L" indicates a low-pass component. For example, "HL1" denotes a band component made of a high-pass component in the horizontal direction and a low-pass component in the vertical direction at the decomposition level "1". When the notation is generalized, "XYn" (where X and Y indicate H and L or L and H, respectively, and n denotes a natural number) denotes a band component made of a band component X in the horizontal direction and a band component Y in the vertical direction at decomposition level "n".

At decomposition level "2", the low-pass component LL1 is split to HH2, HL2, LH2, and LL2 (not shown). Further, at decomposition level "3", the low-pass component LL2 is divided into HH3, HL3, LH3, and LL3. FIG. 2 shows arrangement of the band components HH1 to LL3 generated as described above. FIG. 2 shows an example where the DWT of the decomposition level "3" is performed. In the JPEG 2000 system, generally, DWT of the decomposition level of about 3 to 8 is employed.

Referring to FIG. 1, the quantization unit 14 performs scalar quantization on the transform coefficient WD input from the DWT unit 13 in accordance with a quantization parameter, and outputs a transform coefficient QD obtained by the scalar quantization. The quantization unit 14 also has the function of performing a predetermined bit shifting process so as to give priority to the picture quality in a region of interest set by the ROI unit 17.

Figure 3:
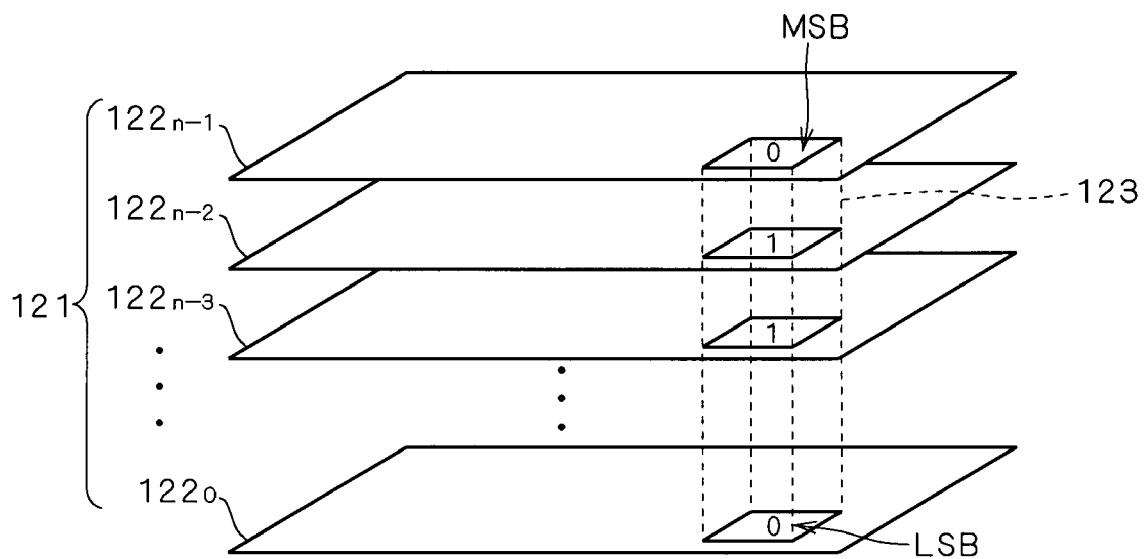
FIG. 3 is a diagram showing n pieces of bit planes obtained by decomposing a code block.

The coefficient bit modeling unit 20 divides the transform coefficient QD input from the quantization unit 14 to 32×32 or 64×64 code blocks. The coefficient bit modeling unit 20 decomposes each of the code blocks to a plurality of bit planes constructed as a two-dimensional array of bits. FIG. 3 is a schematic diagram showing "n" pieces of bit planes $122_0$ to $122_{n-1}$ (n is a natural number) decomposed from a code block 121. As shown in FIG. 3, when a binary value 123 of the transform coefficient at an arbitrary point in the code block 121 is "011 . . . 0", the code block 121 is decomposed so that the bits constructing the binary value 123 belong to the bit planes $122_{n-1}$, $122_{n-2}$, $122_{n-3}$, . . . , and $122_n$. In FIG. 3, the bit plane $122_{n-1}$ is the most significant bit plane made of only the most significant bits (MSB) of the transform coefficient. The bit plane $122_0$ is a least significant bit plane made of only the least significant bits (LSB) of the transform coefficient.

Further, the coefficient bit modeling unit 20 determines the context of each of the bits in each of the bit planes $122_k$ (k=0 to n−1) and, according to the significance of each bit as a result of the determination, decomposes the bit plane $122k$ by using coding passes; an SIG pass (SIGnificance propagation pass), an MR pass (Magnitude Refinement pass), and a CL pass (CLean-up pass). The algorithm of the context determination on each coding pass is determined by EBCOT. According to the EBCOT, "significant" denotes a state where it is known in the preceding coding process that a target coefficient is not zero, and "insignificant" denotes a state where the coefficient value is zero or there is the possibility that the coefficient value is zero.

The coefficient bit modeling unit 20 executes a bit plane coding process using the three coding passes; the SIG pass (the coding pass of a not-significant coefficient which is near a significant coefficient), the MR pass (the coding pass of the significant coefficient), and the CL pass (the coding pass of coefficient information, other than the SIG pass and the MR pass). The bit plane coding is performed by scanning the bits of the bit planes from the most significant bit plane to the least significant bit plane on a four-bit unit basis and determining whether a significant coefficient exists or not. The number of bit planes constructed only by not-significant coefficients (0 bits) is recorded in a packet header. Actual coding starts from a bit plane in which a significant coefficient appears for the first time. The bit plane from which the coding starts is encoded only by the CL pass, and bit planes lower than the bit plane are sequentially coded by the above-described three passes.

The arithmetic coding unit 21 performs arithmetic coding on coded data BD supplied from the coefficient bit modeling unit 20, and outputs coded data AD obtained as a result of the arithmetic coding. Concretely, by using an MQ coder, arithmetic coding is executed in encoding pass units on the basis of the context determination result, on the coded data BD supplied from the coefficient bit modeling unit 20. There is also a case where the arithmetic coding unit 21 performs a bypass process of outputting an object to be coded as it is so as to be included in the coded data AD without performing arithmetic coding on part of the object to be encoded. Although the arithmetic coding is employed in the first embodiment, the invention is not limited to the arithmetic coding and entropy coding of another method may be employed.

The coding amount control unit 22 has the function of controlling the rate of the coded data AD supplied from the arithmetic coding unit 21. Concretely, the coding amount control unit 22 executes post-quantization of rounding down the coded data AD on the band component unit basis, the bit plane unit basis, or the pass unit basis from lower priority in order to obtain a target coding amount (a final coding amount of a compressed image).

The bit stream generating unit 23 generates a bit stream by multiplexing coded data CD supplied from the coding amount control unit 22 and additional information (header information, layer configuration, scalability, a quantization table, and the like), and outputs the bit stream as a compressed image to the outside. The header information includes offset values $X0_{siz}$ and $Y0_{siz}$.

Process of Reference Grid

The processes of the reference grid executed by the tiling unit 12 shown in FIG. 1 will be described in detail hereinbelow.

By performing pre-processes by the DC level shifting unit 10 and the color space converting unit 11, two-dimensional image signals are obtained. To extract a desired image region from the two-dimensional image signals, a coordinate system called a reference grid is used. Concretely, the tiling unit 12 sets a desired image region in the two-dimensional image signals by designating offset values in the row and column directions from the origin of the reference grid.

FIG. 4 is a diagram showing parameters necessary for defining a reference grid. The reference grid has $X_{siz}$ pieces of grid points in the horizontal direction and $Y_{siz}$ pieces of grid points in the vertical direction. The coordinates of the upper left corner (the origin) (X, Y) are (0, 0), the coordinates of the lower left corner are $(0, Y_{siz}-1)$, the coordinates of the upper right corner are $(X_{siz}-1, 0)$, and the coordinates of the lower right corner are $(X_{siz}-1, Y_{siz}-1)$. By designating the offset values $X0_{siz}$ and $Y0_{siz}$ from the origin (0, 0) of the reference grid, the hatched desired image region is set. That is, the desired image region is specified as a rectangular region surrounded by four vertexes having coordinates of $(X0_{siz}, Y0_{siz})$ $(X0_{siz}, Y_{siz}-1)$, $(X_{siz}-1, Y0_{siz})$, and $(X_{siz}-1, Y_{siz}-1)$.

In JPEG2000, Part 1, Profile 0, each of the offset values $X0_{siz}$ and $Y0_{siz}$ is "0". In the case where the process is not conformed with the JPEG2000, Part 1, Profile 0, arbitrary values can be set as the offset values $X0_{siz}$ and $Y0_{siz}$.

The tiling unit 12 inputs information of the arbitrarily-set offset values $X0_{siz}$ and $Y0_{siz}$ as the reference grid information GD to the DWT unit 13.

Processes of DWT Unit 13

The processes of the DWT executed by the DWT unit 13 shown in FIG. 1 will be described in detail hereinbelow.

Figure 5:
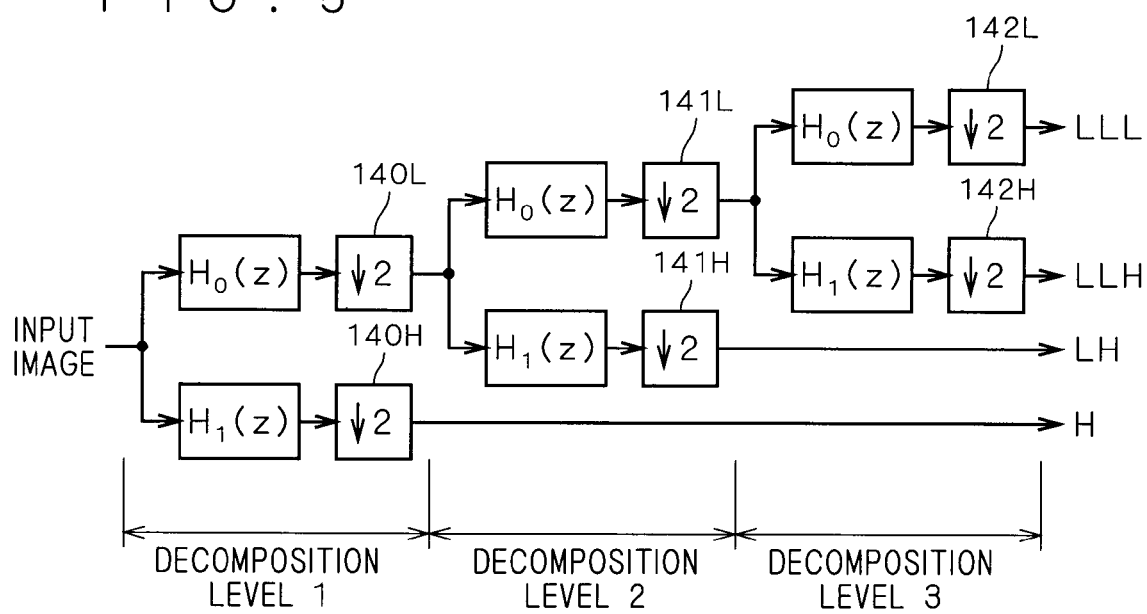
FIG. 5 is a diagram showing a decomposition-side filter bank.

First, an FIR-type filter realizing the DWT will be described. FIG. 5 is a diagram showing decomposition-side filter banks. In the decomposition-side filter banks shown in FIG. 5, down samplers 140L to 142L perform a reducing process of holding only even-numbered samples in a data sequence out from each of low-pass filters $H_0(z)$ and discarding odd-numbered samples. The other down samplers 140H to 142H perform a reducing process of holding only odd-numbered samples and discarding even-numbered samples in a data sequence output from high-pass filters $H_1(z)$. As described above, data output from the filters $H_0(z)$ and $H_1(z)$ is subjected to the reducing process of separating data into two phases (polyphases) of the even-numbered phase and the odd-numbered phase. However, it is not efficient that the filters $H_0(z)$ and $H_1(z)$ perform the filter process on all of input data irrespective of the even-numbers and odd-numbers. In the first embodiment, the low-pass filter $H_0(z)$ executes the filter process only on even-numbered data sequences, and the high-pass filter $H_1(z)$ executes the filter process only on odd-numbered data sequences. As a result, the filters $H_0(z)$ and $H_1(z)$ execute the filter process and the reducing process simultaneously for each of the phases.

Figure 6:
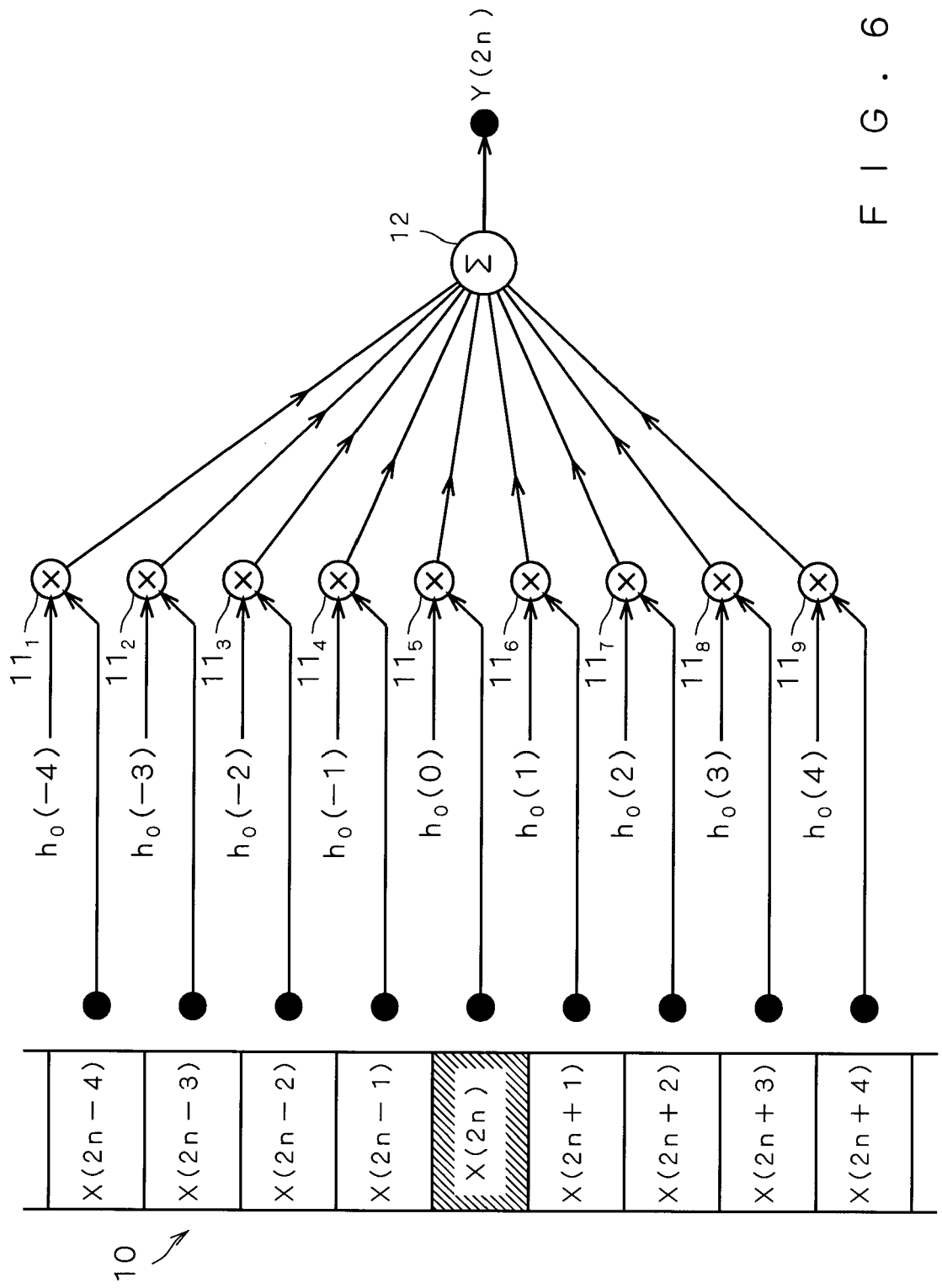
FIG. 6 is a diagram showing the configuration of an FIR-type low pass filter on the decomposition side.
Figure 7:
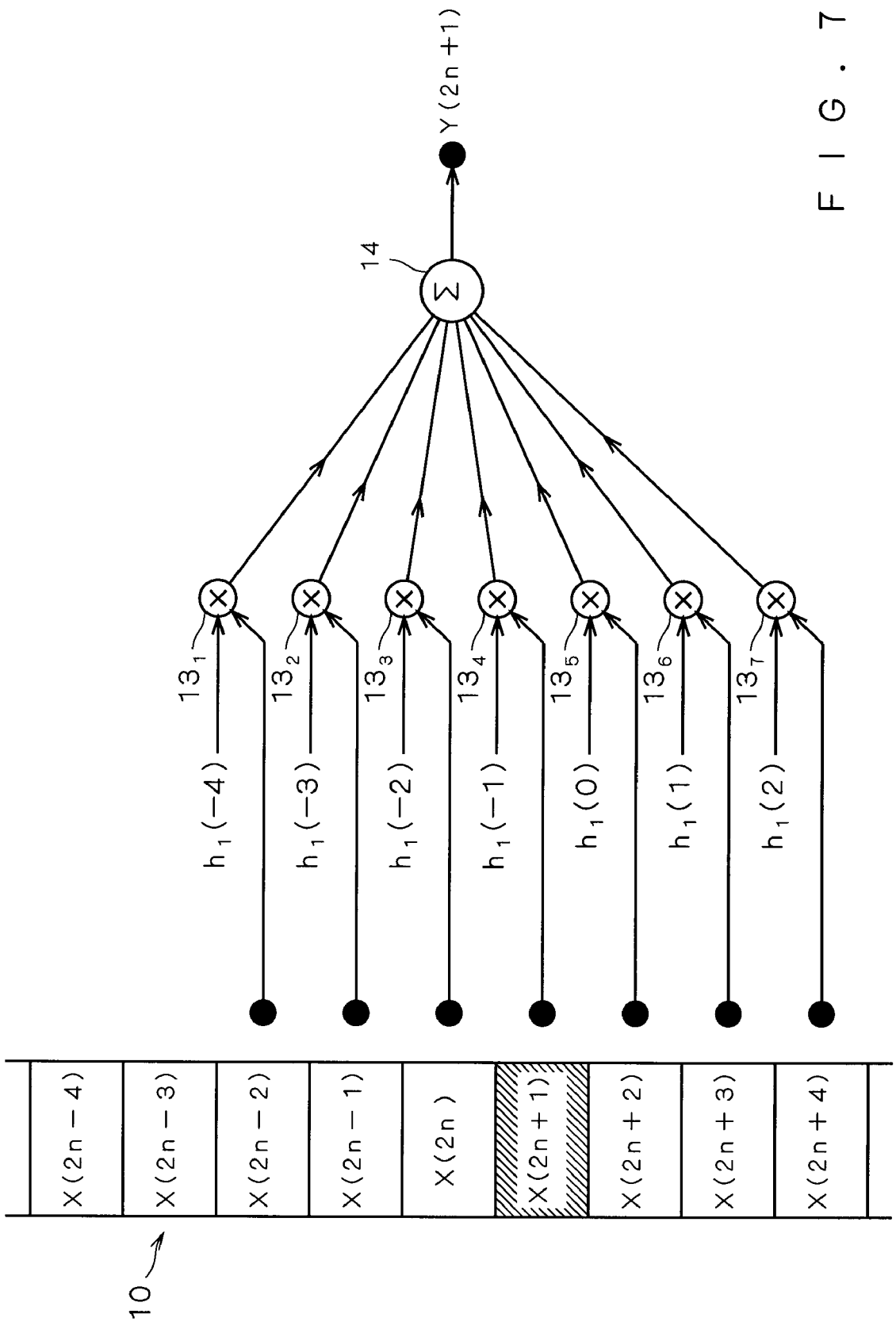
FIG. 7 is a diagram showing the configuration of an FIR-type high pass filter on the decomposition side.

FIG. 6 is a diagram showing the configuration of the decomposition-side FIR low-pass filter $H_0(z)$. FIG. 7 is a diagram showing the configuration of the decomposition-side FIR high-pass filter $H_1(z)$. An input image 10 is constructed by continuous input data sequences . . . X(2n−4), X(2n−3), . . . , X(2n), . . . , X(2n+3), X(2n+4), . . . (n: integer). As shown in FIG. 6, the low-pass filter $H_0(z)$ has filter factors $h_0(-4), h_0(-3), \ldots, h_0(0), \ldots h_0(3)$, and $h_0(4)$ corresponding to 9 taps, multipliers $11_1$ to $11_9$ for convoluting the input data sequences and the filter factors $h_0(-4)$ to $h_0(4)$, and an adder 12. The low-pass filter $H_0(z)$ selectively executes the convolution on the even-numbered data X(2n) in accordance with the following equation (1), and outputs data Y(2n).

$$Y(2n) = \sum_{k=-4}^{4} \times (2n+k)h_0(k) \quad (1)$$

As shown in FIG. 7, the high-pass filter $H_1(z)$ has filter factors $h_1(-4), h_1(-3), \ldots, h_1(0)$, and $h_1(2)$ corresponding to 7 taps, multipliers $13_1$ to $13_7$ for convoluting the input data sequences and the filter factors $h_1(-4)$ to $h_1(2)$, and an adder 14. The high-pass filter $H_1(z)$ selectively executes the convolution on the odd-numbered data X(2n+1) in accordance with the following equation (2), and outputs data Y(2n+1).

$$Y(2n+1) = \sum_{k=-4}^{2} \times (2n+2+k)h_1(k) \quad (2)$$

The following table 1 shows filter factors $<h_0(n)>$ and $<h_1(n)>$ of a Daubechies filter.

TABLE 1

Decomposition-side filter factors of Daubechies filter of 9 × 7 taps

| n | $<h_0(n)>$ | n | $<h_1(n)>$ |
|---|---|---|---|
| 0 | +0.602949018236360 | −1 | +1.115087052457000 |
| ±1 | +0.266864118442875 | −2, 0 | −0.591271763114250 |
| ±2 | −0.078223266528990 | −3, 1 | −0.057543526228500 |
| ±3 | −0.016864118442875 | −4, 2 | +0.091271763114250 |
| ±4 | +0.026748757410810 | | |

The wavelet transform (decomposition side) of the DWT unit 13 used in Part 1 of JPEG 2000 has the following rules.

An even-numbered output is a low-pass output, and an odd-numbered output is a high-pass output.

In Part 1 Profile 0, the upper left corner of each subband is used as the origin, so that the first output is always a low-pass output.

Next, the number of pieces of data to be read to the DWT unit 13 in order to execute DWT will be considered. FIGS. 8A to 8D are diagrams showing positional relations of input/output data in the case of executing the DWT by using a filter of 9×7 taps. FIG. 8A shows a case where a target data sequence starts from even-numbered data (low-pass data L) and the number of data pieces is an even number. FIG. 8B shows a case where a target data sequence starts from even-numbered data (low-pass data L) and the number of data pieces is an odd number. FIG. 8C shows a case where a target data sequence starts from odd-numbered data (high-pass data H) and the number of data pieces is an even number. FIG. 8D shows a case where a target data sequence starts from odd-numbered data (high-pass data H) and the number of data pieces is an odd number. In the case of using a filter of 9×7 taps, four patterns shown in FIGS. 8A to 8D are considered by combinations of odd-number and even-number of start data and odd-number and even-number as the number of data pieces. In Part 1 Profile 0, even-numbered data is always start data. Consequently, only the cases of FIGS. 8A and 8B are possible.

Also in the case of a filter of 5×3 taps used in lossless compression, the positional relations of input/output data are similar to those of FIGS. 8A to 8D. The points different from the case of using a filter of 9×7 taps are that the number of taps of a filter on the low-pass side is five, and that on the high-pass side is three.

Figure 9:
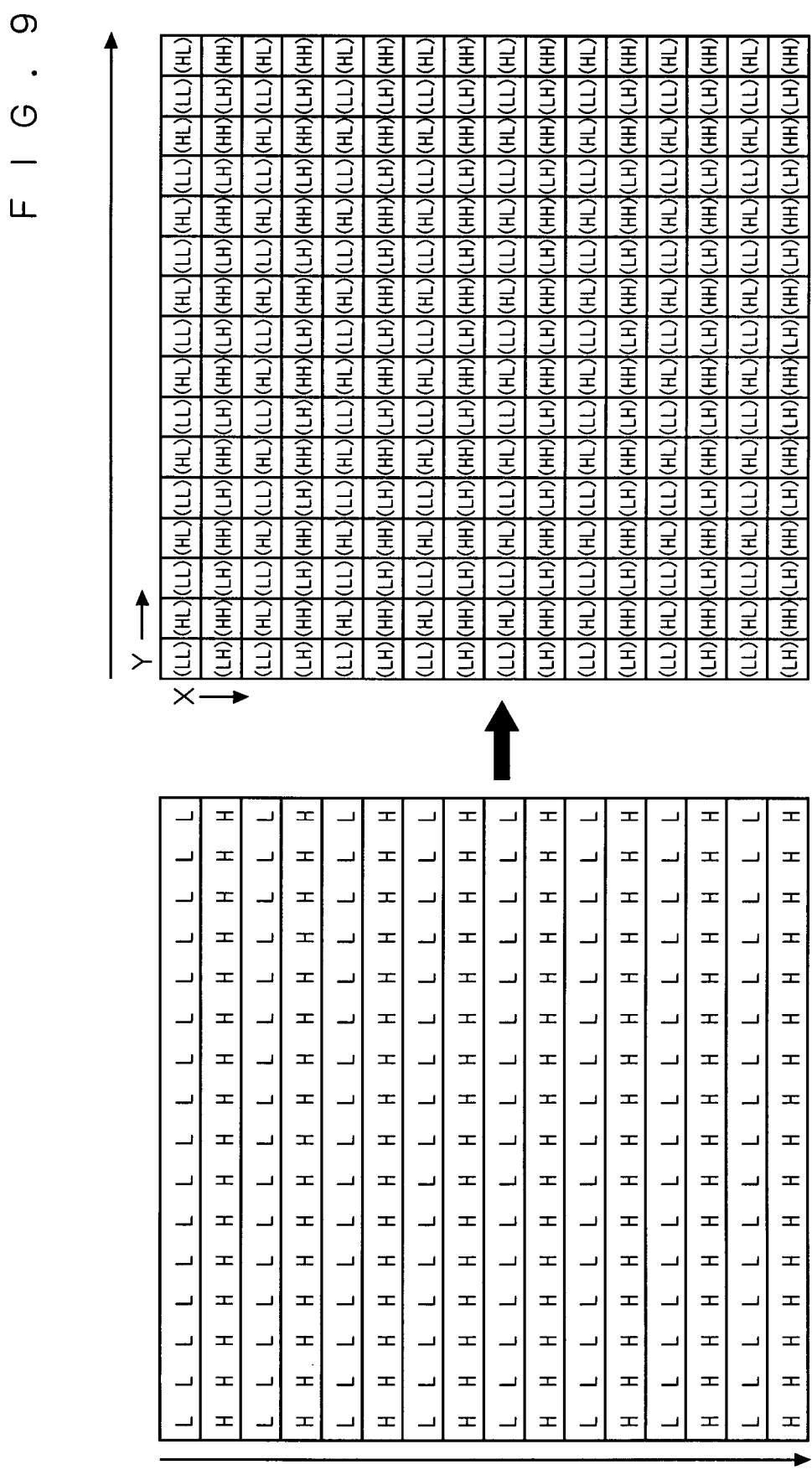
FIG. 9 is a diagram showing a state where image signals of 16 rows by 16 columns are subjected to a two-dimensional filter in accordance with the order of a vertical filter and a horizontal filter.

FIG. 9 is a diagram showing a state where a two-dimensional filter is applied on image signals of 16 rows (from the $0^{th}$ row to the $15^{th}$ row) by 16 columns (from the $0^{th}$ column to the $15^{th}$ column) in order of a vertical filter and a horizontal filter. The left part shows a state after the vertical filter is applied. The right part shows a state after the horizontal filter is applied.

As shown in the left part of FIG. 9, by applying the vertical filter, vertical components in even-numbered rows become low-pass data L, and vertical components in odd-numbered rows become high-pass data H. As shown in the right part of FIG. 9, by further applying the horizontal filter, horizontal components in even-numbered columns become low-pass data L, and horizontal components in odd-numbered columns become high-pass data H. In the right part of FIG. 9, (LL) denotes both of the horizontal and vertical components are L, (HL) denotes that the horizontal component is H and the vertical component is L, (LH) denotes that the horizontal component is L and the vertical component is H, and (HH) indicates that both of the horizontal and vertical components are H. The arrow X indicates the vertical direction, and the arrow Y expresses the horizontal direction.

The case where the offset values $X0_{siz}$ and $Y0_{siz}$ are set to arbitrary values by the tiling unit 12 will be examined. For simplicity of explanation, the case where DWT is executed only once is assumed.

In the case where the offset values $X0_{siz}$ and $Y0_{siz}$ are even numbers and the number of pieces of data is an even number, the relations of even and odd numbers of input data are as shown in (a) in FIG. 8. Therefore, in this case, the execution order of filters is the low-pass filter, the high-pass filter, the low-pass filter, . . . , and the high-pass filter. In the case where the offset values $X0_{siz}$ and $Y0_{siz}$ are even numbers and the number of pieces of data is an odd number, the relations of even and odd numbers of input data are as shown in (b) in FIG. 8. Therefore, in this case, the execution order of filters is the low-pass filter, the high-pass filter, the low-pass filter, . . . , and the low-pass filter.

In the case where the offset values $X0_{siz}$ and $Y0_{siz}$ are odd numbers and the number of pieces of data is an even number, the relations of even and odd numbers of input data are as shown in (c) in FIG. 8. Therefore, in this case, the execution order of filters is the high-pass filter, the low-pass filter, the high-pass filter, . . . , and the low-pass filter. In the case where the offset values $X0_{siz}$ and $Y0_{siz}$ are odd numbers and the number of pieces of data is an odd number, the relations of even and odd numbers of input data are as shown in (d) in FIG. 8. Therefore, in this case, the execution order of filters is the high-pass filter, the low-pass filter, the high-pass filter, ..., and the high-pass filter.

As described above, in the case of setting the offset values $X0_{siz}$ and $Y0_{siz}$ to arbitrary values, the execution order of the low-pass filter and the high-pass filter of each of the horizontal and vertical filters has to be changed in accordance with the even/odd numbers of the offset values $X0_{siz}$ and $Y0_{siz}$ and the even/odd numbers of the data pieces.

The configuration and operation of the DWT unit 13 will be described in more detail. The processes of line-based wavelet transform as one of two-dimensional wavelet transforms will be described.

Figure 10:
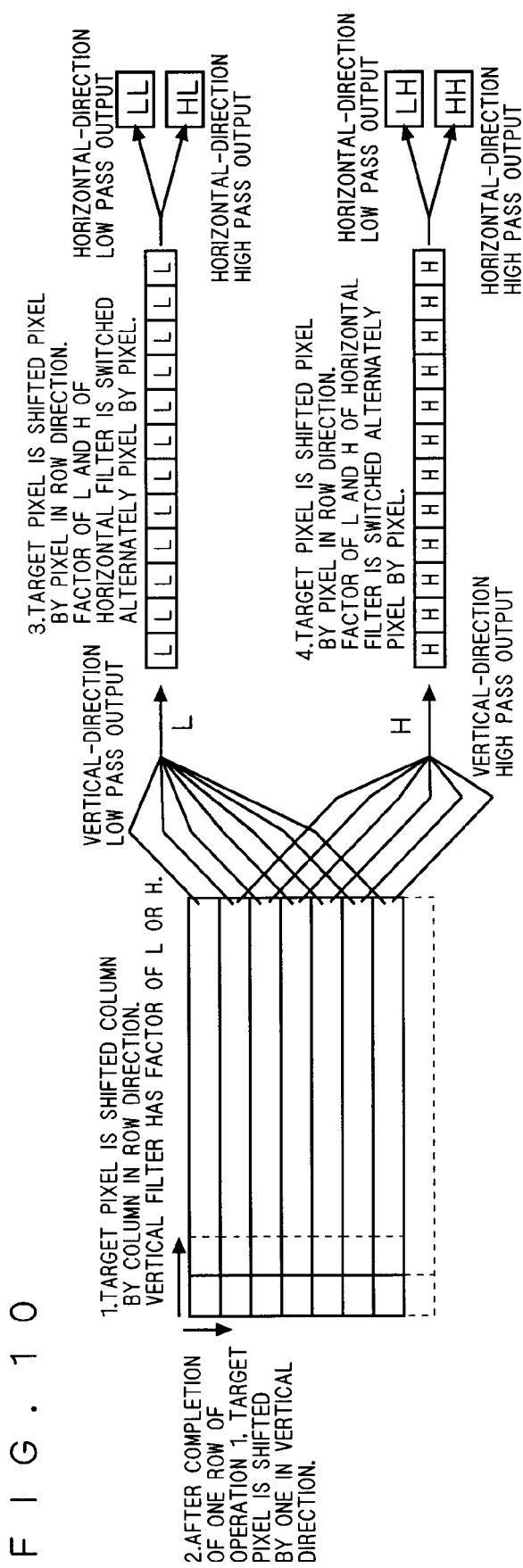
FIG. 10 is a diagram showing an outline of the configuration of a DWT unit realizing line-based wavelet transform.

FIG. 10 is a diagram showing an outline of the configuration of the DWT unit 13 realizing the line-based wavelet transform. In the configuration, two horizontal filters are disposed after one vertical filter. The number of filters is arbitrary. By increasing the number of filters, the speed of data processing can be increased. On the contrary, by decreasing the number of filters, the circuit scale can be reduced. Since increase in data processing speed and reduction in the circuit scale have the tradeoff relation, it is sufficient to arbitrarily design the number of filters in accordance with an object and environment.

With reference to FIG. 10, first, the filter process with the vertical filter is performed. A target sequence is shifted one by one in the row direction. After processes of one row are finished, the target sequence is shifted by one in the vertical direction (column direction). The factor of the vertical filter is L or H in the same row in accordance with the even/odd numbers of the offset value $Y0_{siz}$, and L and H are alternately switched row by row. Next, on each of the low-pass and high-pass outputs in the vertical direction, the filter process with the horizontal filter is performed. A target pixel is shifted one by one in the row direction. The factor of the horizontal filter is L or H, and L and H are switched alternately in accordance with the even/odd numbers of the offset value $X0_{siz}$. As a result, in the horizontal filter corresponding to a low-pass output in the vertical direction, the component (LL) is obtained as a low-pass output in the horizontal direction, and the component (HL) is obtained as a high-pass output in the horizontal direction. In the horizontal filter corresponding to a high-pass output in the vertical direction, the component (LH) is obtained as a low-pass output in the horizontal direction, and the component (HH) is obtained as a high-pass output in the horizontal direction.

Figure 11:
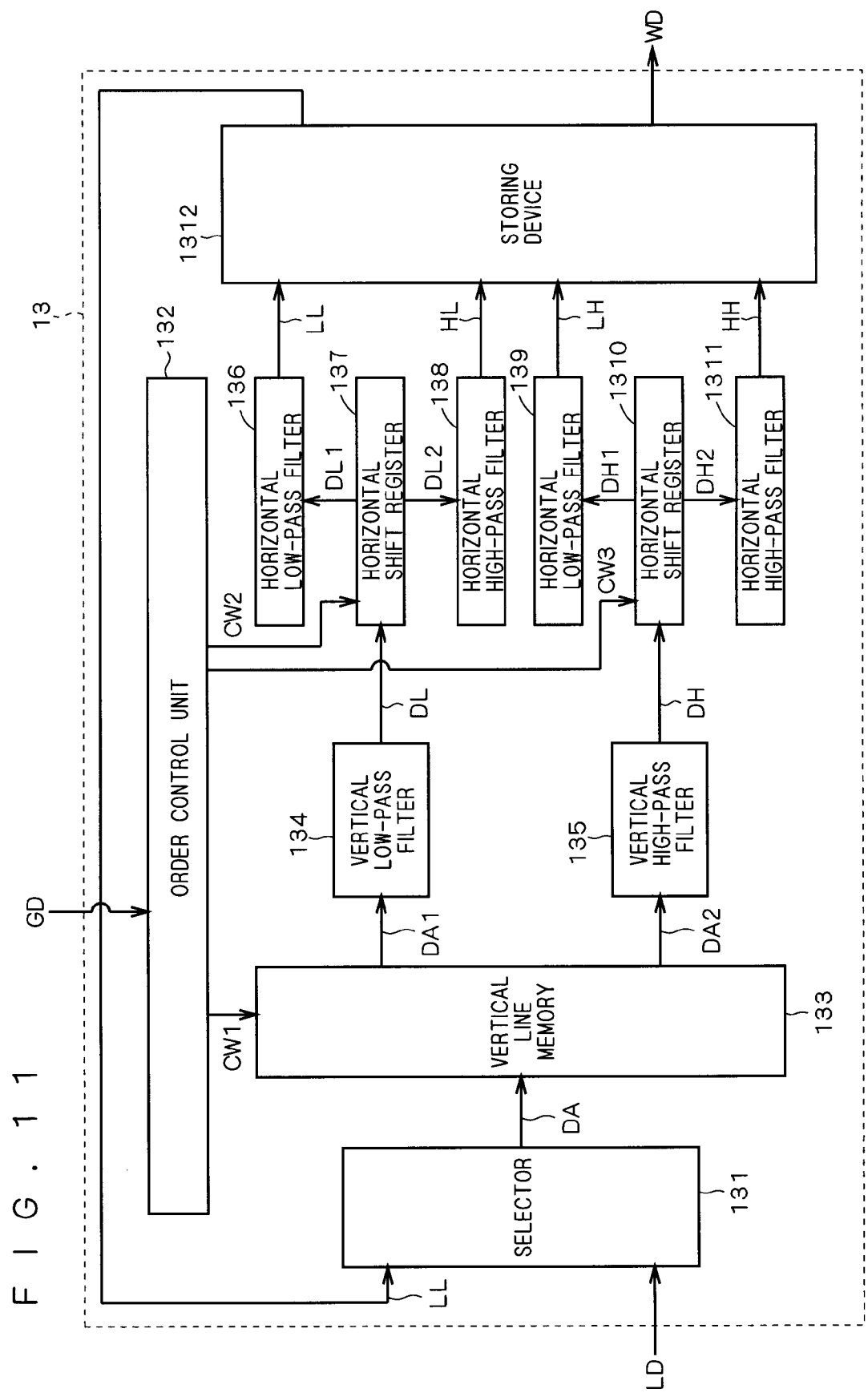
FIG. 11 is a block diagram showing a concrete configuration of the DWT unit realizing the line-based wavelet transform.

FIG. 11 is a block diagram showing a concrete configuration of the DWT unit 13 realizing the line-based wavelet transform. As shown in FIG. 11, the DWT unit 13 includes an order control unit 132, a selector 131, a vertical line memory 133, a vertical low-pass filter 134, a vertical high-pass filter 135, horizontal shift registers 137 and 1310, horizontal low-pass filters 136 and 139, horizontal high-pass filters 138 and 1311, and a storing device 1312.

To the order control unit 132, the reference grid information GD is input from the tiling unit 12 shown in FIG. 1. The order control unit 132 generates control signals CW1 to CW3 on the basis of the reference grid information GD and outputs the control signals CW1 to CW3. The control signal CW1 is a signal for controlling the execution order of the vertical low-pass filter 134 and the vertical high-pass filter 135. The control signal CW2 is a signal for controlling the execution order of the horizontal low-pass filter 136 and the horizontal high-pass filter 138. The control signal CW3 is a signal for controlling the execution order of the horizontal low-pass filter 139 and the horizontal high-pass filter 1311.

Figure 12:
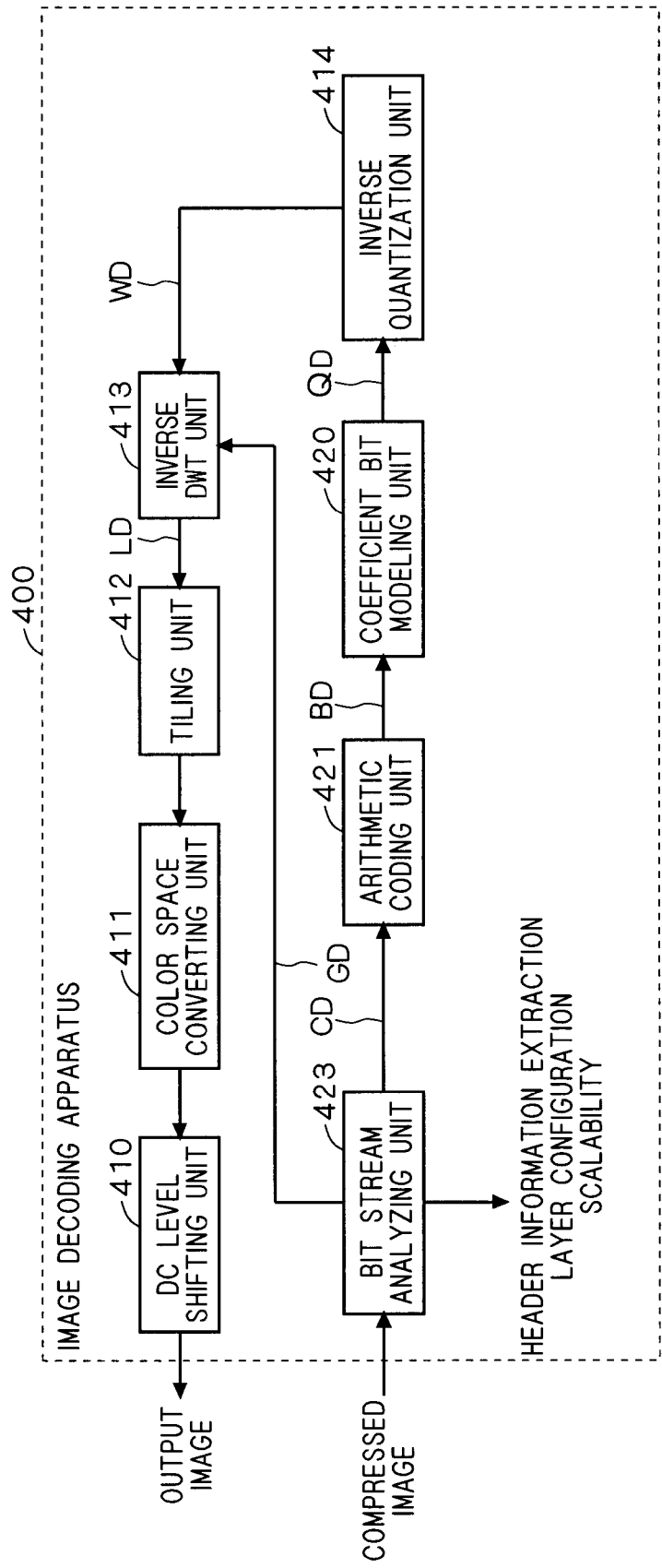
FIG. 12 is a functional block diagram showing the configuration of an image decoding apparatus according to a second embodiment of the invention.

To the selector 131, the image signal LD is input from the tiling unit 12 shown in FIG. 12. To the selector 131, the data LL of the component (LL) generated by the DWT is also recursively input. The selector 131 selects the image signal LD in the DWT of the first time, selects the data LL in the DWT of the second and subsequent times, and outputs the selected data as data DA.

To the vertical line memory 133, the data DA is input from the selector 133, and the control signal CW1 is input from the order control unit 132. On the basis of the data DA, the vertical line memory 133 inputs data DA1 to the vertical low-pass filter 134 and inputs data DA2 to the vertical high-pass filter 135. At that time, on the basis of the control signal CW1, the output order of the data DA1 and DA2 is controlled. Concretely, when the offset value $Y0_{siz}$ is an even number, the data is output in order of DA1, DA2, DA1, DA2, .... On the other hand, when the offset value $Y0_{siz}$ is an odd number, the data is output in order of DA2, DA1, DA2, DA1, .... DA1 corresponds to a variable X(2n+k) of the right side of the equation (1), and DA2 corresponds to a variable X(2n+2+k) of the right side of the equation (2).

The vertical low-pass filter 134 performs a low-pass filter process on the data DA1 input from the vertical line memory 133 and outputs a vertical low-pass component DL. The vertical high-pass filter 135 performs a high-pass filter process on the data DA2 input from the vertical line memory 133 and outputs a vertical high-pass component DH.

To the horizontal shift register 137, the vertical low-pass component DL is input from the vertical low-pass filter 134, and the control signal CW2 is input from the order control unit 132. On the basis of the vertical low-pass component DL, the horizontal shift register 137 inputs data DL1 to the horizontal low-pass filter 136 and inputs data DL2 to the horizontal high-pass filter 138. At that time, on the basis of the control signal CW2, the output order of the data DL1 and DL2 is controlled. Concretely, when the offset value $X0_{siz}$ is an even number, the data is output in order of DL1, DL2, DL1, DL2, .... On the other hand, when the offset value $X0_{siz}$ is an odd number, the data is output in order of DL2, DL1, DL2, DL1, .... DL1 corresponds to the variable X(2n+k) of the right side of the equation (1), and DL2 corresponds to the variable X(2n+2+k) of the right side of the equation (2).

The horizontal low-pass filter 136 performs a low-pass filter process on the data DL1 input from the horizontal shift register 137 and outputs the data LL of the horizontal low-pass component and the vertical low-pass component. The horizontal high-pass filter 138 performs a high-pass filter process on the data DL2 input from the horizontal shift register 137 and outputs the data HL of the horizontal high-pass component and the vertical low-pass component. The data LL and HL is input to the storing device 1312 and stored.

To the horizontal shift register 1310, the vertical high-pass component DH is input from the vertical high-pass filter 135, and the control signal CW3 is input from the order control unit 132. On the basis of the vertical high-pass component DH, the horizontal shift register 1310 inputs data DH1 to the horizontal low-pass filter 139 and inputs data DH2 to the horizontal high-pass filter 1311. At that time, on the basis of the control signal CW3, the output order of the data DH1 and DH2 is controlled. Concretely, when the offset value $X0_{siz}$ is an even number, the data is output in order of DH1, DH2, DH1, DH2, .... On the other hand, when the offset value $X0_{siz}$ is an odd number, the data is output in order of DH2, DH1, DH2, DH1, .... DH1 corresponds to the variable X(2n+k) of the right side of the equation (1), and DH2 corresponds to the variable X(2n+2+k) of the right side of the equation (2).

The horizontal low-pass filter 139 performs a low-pass filter process on the data DH1 input from the horizontal shift register 1310 and outputs the data LH of the horizontal low-pass component and the vertical high-pass component. The horizontal high-pass filter 1311 performs a high-pass filter process on the data DH2 input from the horizontal shift register 1310 and outputs the data HH of the horizontal high-pass component and the vertical high-pass component. The data LH and HH is input to the storing device 1312 and stored.

The data HL, LH, and HH stored in the storing device 1312 is output as the transform coefficient WD from the storing device 1312 and is supplied to the quantization unit 14 shown in FIG. 1.

When the data LL stored in the storing device 1312 has to be subjected to the DWT again, the data LL is input to the selector 131 and undergoes recursive DWT. On the other hand, when the data LL does not have to be subjected to the DWT again, the data LL is output as the transform coefficient WD from the storing device 1312 and supplied to the quantization unit 14 shown in FIG. 1.

Effect of Image Encoding Apparatus 1

In the image encoding apparatus 1 according to the first embodiment, the order control unit 132 of the DWT unit 13 variably controls the execution order of the low-pass filter and the high-pass filter with respect to each of the vertical and horizontal filters. Therefore, the execution order of outputs of the low-pass and high-pass filters can be controlled in accordance with the designated offset values $X0_{siz}$ and $Y0_{siz}$ of the reference grid. While designating the offset values $X0_{siz}$ and $Y0_{siz}$ of the reference grid to arbitrary values, image signals can be coded.

Moreover, the DWT unit 13 is constructed so as to realize the line-based wavelet transformation. Consequently, as compared with a two-dimensional wavelet transformation in which all of transform coefficients are stored in a memory and a vertical filter and a horizontal filter are applied in order, the storage capacity of the memory can be reduced.

Second Embodiment

Although the image encoding apparatus for coding an input image signal and outputting a compressed image has been described in the foregoing first embodiment, in a second embodiment, an image decoding apparatus for decoding an input compressed image and outputting an image signal will be described. The points different from the first embodiment will be mainly described below.

Outline of General Apparatus

FIG. 12 is a functional block diagram showing the configuration of an image decoding apparatus 400 conformed with JPEG2000, as a second embodiment of the present invention. As shown in FIG. 12, the image decoding apparatus 400 has a DC level shifting unit 410, a color space converting unit 411, a tiling unit 412, an inverse DWT unit 413, an inverse quantization unit 414, a coefficient bit modeling unit 420, an arithmetic decoding unit 421, and a bit stream analyzing unit 423.

All or part of the processing units 410 to 414, 420, 421, and 423 constructing the image decoding apparatus 400 may be constructed by hardware or a program for making a microprocessor function.

The bit stream analyzing unit 423 analyzes a bit stream of a compressed image supplied from the outside and separates the coded data CD and additional information (header information, layer configuration, scalability, a quantization table, and the like).

The bit stream analyzing unit 423 extracts the offset values $X0_{siz}$ and $Y0_{siz}$ from the origin of the reference grid on the basis of the header information of the bit stream of the input compressed image, and outputs the extracted information as the reference grid information GD.

The arithmetic coding unit 421 performs arithmetic decoding on the coded data CD supplied from the bit stream analyzing unit 423 and outputs decoded data BD. Although the arithmetic decoding is employed in the second embodiment, the invention is not limited to the arithmetic decoding and entropy decoding of another method may be employed.

The coefficient bit modeling unit 420 combines a plurality of bit planes constructed as two-dimensional arrays of the bits shown in FIG. 3 on the basis of the decoded data BD supplied from the arithmetic decoding unit 421, thereby generating a code block. The coefficient bit modeling unit 420 combines 32×32 or 64×64 code blocks, thereby generating the transform coefficient QD.

The inverse quantization unit 414 performs scalar inverse-quantization on the transform coefficient QD supplied from the coefficient bit modeling unit 420 and outputs, as a result of the scalar inverse-quantization, the transform coefficient WD. The inverse quantization unit 414 also has the function of performing a predetermined bit shifting process.

The inverse DWT unit 413 performs integer-type or real-type inverse DWT on the tile unit basis on the transform coefficient WD supplied from the inverse quantization unit 414 and recursively combines a plurality of high-pass and low-pass components divided from the transform coefficient WD, thereby generating the image signal LD.

The tiling unit 412 generates an image signal by performing a process of combining a plurality of tiles on the image signal LD supplied from the inverse DWT unit 413. In the present invention, a case of processing image signals of one frame as one tile and a case where image signals are divided into a small number of tiles each having a relatively large size to avoid or suppress occurrence of tile distortion are assumed. In the case where image signals of one frame are processed as one tile, it is sufficient to output the image signal LD supplied from the inverse DWT unit 413 as it is to a function block at the next stage. The present invention can be also applied to an apparatus in which a normal tiling process is performed.

The color space converting unit 411 performs a predetermined color space converting process on the image signal input from the tiling unit 412. For example, the color space converting unit 411 converts a YCbCr signal or YUV signal to an RGB signal and outputs the RGB signal.

The DC level shifting unit 410 performs a DC level shifting process as necessary on the image signal supplied from the color space converting unit 411 and outputs an image signal (the output image in FIG. 12).

Processes of Inverse DWT Unit 413

The processes of the inverse DWT executed by the inverse DWT unit 413 shown in FIG. 12 will be described in detail hereinbelow.

First, an FIR-type filter realizing the inverse DWT will be described. FIG. 13 is a diagram showing composition-side filter banks. A low-pass filter $G_0(z)$ and a high-pass filter $G_1(z)$ on the composition side shown in FIG. 13 are expressed using the z transform as shown by the following equations 3 and 4, respectively.

$$\begin{cases} G_0(z) = \sum_{k=0}^{6} g_0(3-k)z^{-k} & (3) \\ G_1(z) = \sum_{k=0}^{8} g_1(5-k)z^{-k} & (4) \end{cases}$$

In the equations 3 and 4, a filter factor $g_0(k)$ (k=–3 to 3) and a filter factor $g_1(k)$ (k=–3 to 5) show impulse response, and Z-k shows a delay of the k-th order.

Figure 14:
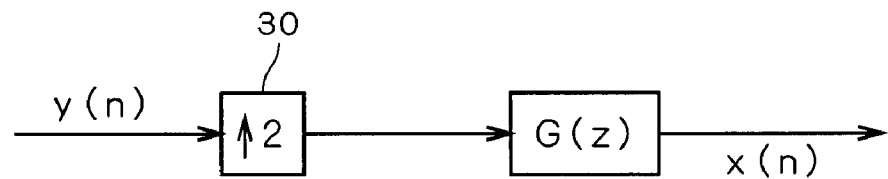
FIG. 14 is a diagram showing combination of an up-sampler and a filter.

The filter banks on the composition side shown in FIG. 13 can be modified by polyphase decomposition described below. FIG. 14 is a diagram showing a combination of an up-sampler 30 and a filter G(z). The filter G(z) is an FIR filter having a filter factor h(k) (k: integer). The up-sampler 30 performs an up-sampling process of inserting a zero value between values of an input signal y(n), and the filter G(z) outputs a signal x(n) obtained by interpolating output data of the up-sampler 30. The filter G(z) is a transfer function using the z transform and can be modified to the form of $G(z)=R_0(z^2)z^{-1}+R_1(z^2)$. Such expression is called "type 2 polyphase decomposition". Filters $R_0(z^2)$ and $R_1(z^2)$ decomposed in two phases are called "polyphase filters".

Figure 15:
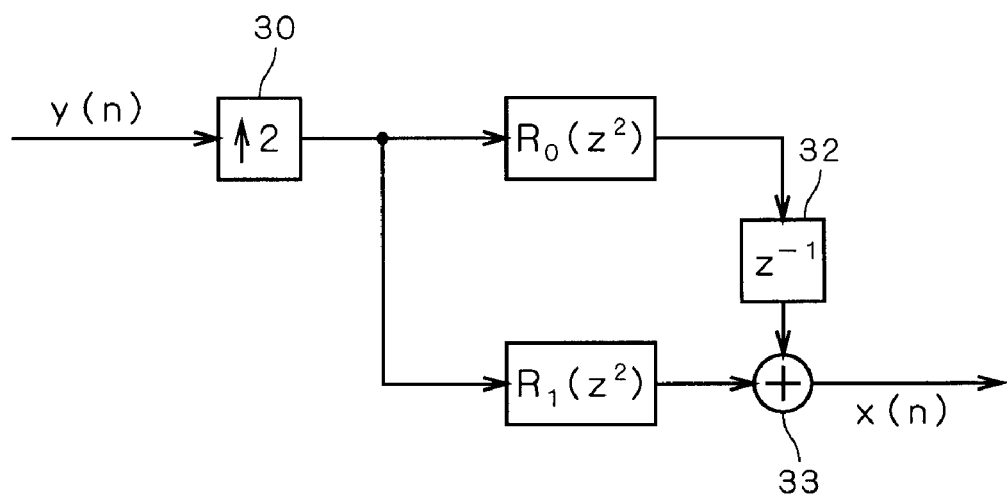
FIG. 15 is a diagram showing polyphase expression of a filter configuration illustrated in FIG. 14.
Figure 16:
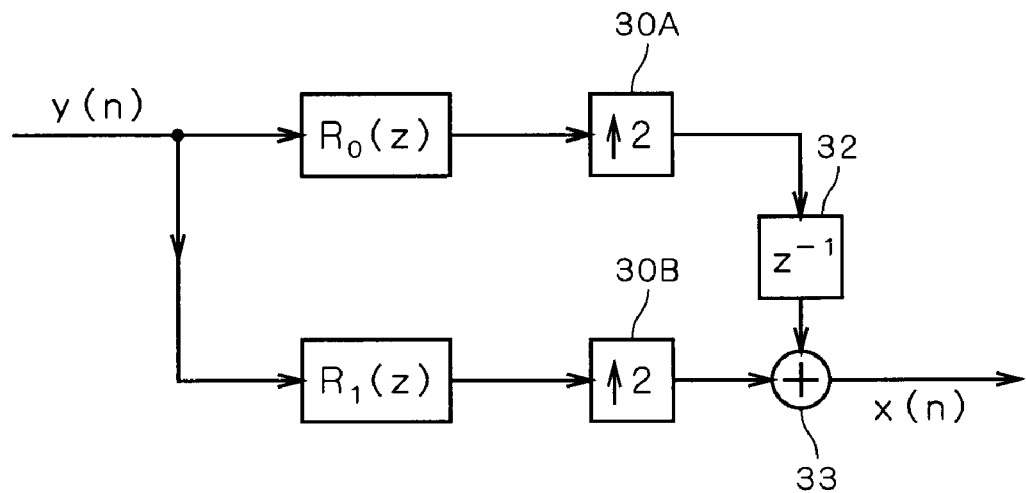
FIG. 16 is a diagram showing another polyphase expression of the filter configuration illustrated in FIG. 14.

Based on the polyphase expression of the filters, as shown in FIG. 15, the FIR filter G(z) is expressed by the two polyphase filters $R_0(z^2)$ and $R_1(z^2)$, a delay element 32, and an adder 33. Specifically, an output signal of the first polyphase filter $R_0(z^2)$ is delayed by one cycle by the delay element 32 and added to an output signal of the second polyphase filter $R_1(z^2)$ in the adder 33. Further, the filter configuration of FIG. 15 is equivalent to that of FIG. 16. Therefore, it can be said that output signals x(n) are output signals of the filters $R_0(z)$ and $R_1(z)$ which are alternately output.

The low-pass filter $G_0(z)$ and the high-pass filter $G_1(z)$ on the composition side shown in FIG. 13 can be modified as the following equations 3A and 4A, respectively, by a transfer function using the z transform.

$$\begin{cases} G_0(z) = R_0(z^2) + R_1(z^2) & (3A) \\ G_1(z) = K_0(z^2) + K_1(z^2) & (4A) \end{cases}$$

$R_0(z^2)$ and $R_1(z^2)$ in Equation 3A show polyphase filters constructing the composition-side low-pass filter $G_0(z)$, and $K_0(z^2)$ and $K_1(z^2)$ in Equation 4A show polyphase filters constructing the composition-side high-pass filter $G_1(z)$.

Figure 17:
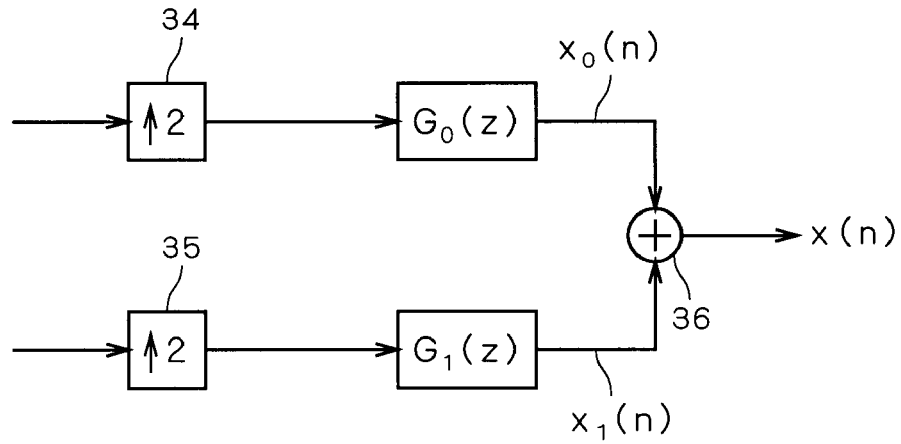
FIG. 17 is a diagram showing a composition-side filter bank.
Figure 18:
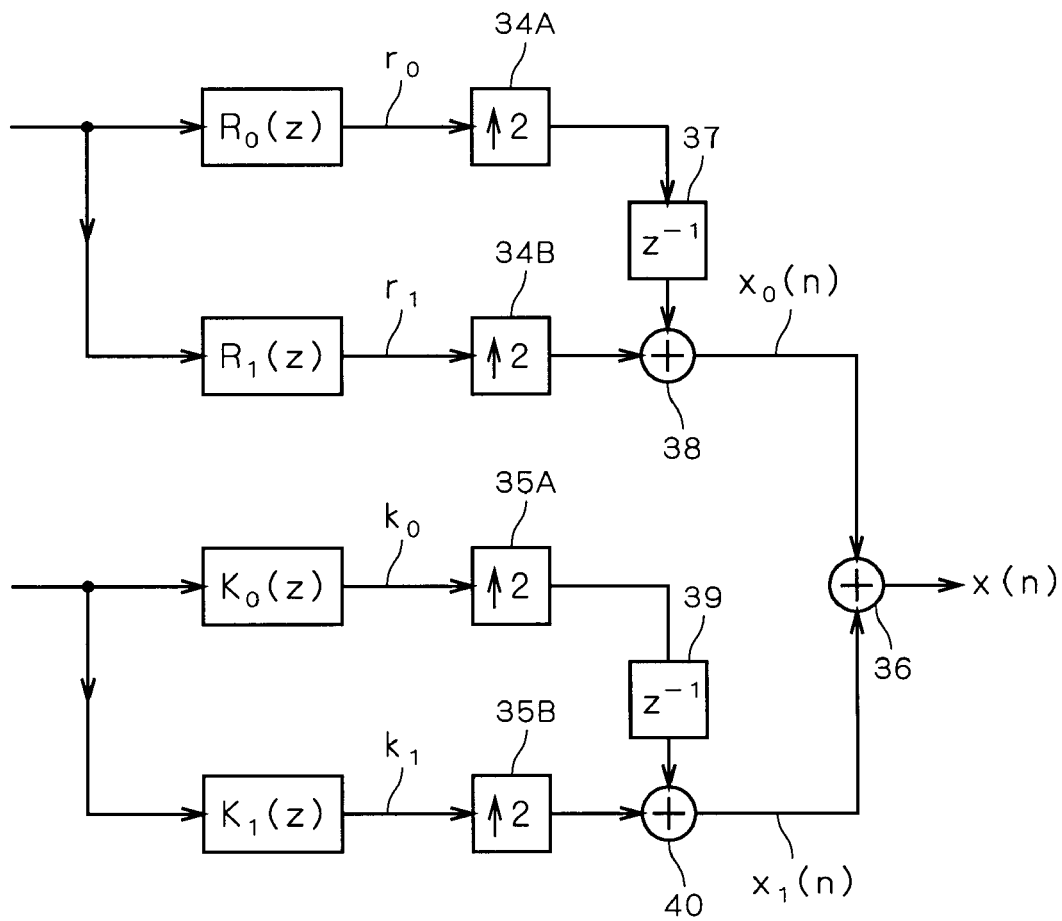
FIG. 18 is a diagram showing polyphase expression of the filter bank illustrated in FIG. 17.

Therefore, based on the above-described polyphase expression, the filter bank on the composition side shown in FIG. 17 can be modified to a filter configuration shown in FIG. 18. In FIGS. 17 and 18, reference numerals 34, 35, 34A, 34B, 35A, and 35B indicate up-samplers, reference numerals 36, 38, and 40 denote adders, and 37 and 39 denote delay elements.

Therefore, an output signal $x_0(n)$ of the adder 38 on the low-pass filter side is output signals $r_0$ and $r_1$ of the polyphase filters $R_0(z)$ and $R_1(z)$ which are alternately output. An output signal $x_1(n)$ of the adder 40 on the high-pass filter side is output signals $k_0$ and $k_1$ of the polyphase filters $K_0(z)$ and $K_1(z)$ which are alternately output. As a result, an even-numbered output signal x(2k) in the output signals x(n) of the adder 36 can be expressed as the sum $r_0+k_0$ of the output signals of the polyphase filters $R_0(z)$ and $K_0(z)$, and an odd-numbered output signal x(2k+1) can be expressed as the sum $r_1+k_1$ of the output signals of the polyphase filters $R_1(z)$ and $K_1(z)$.

Figure 19:
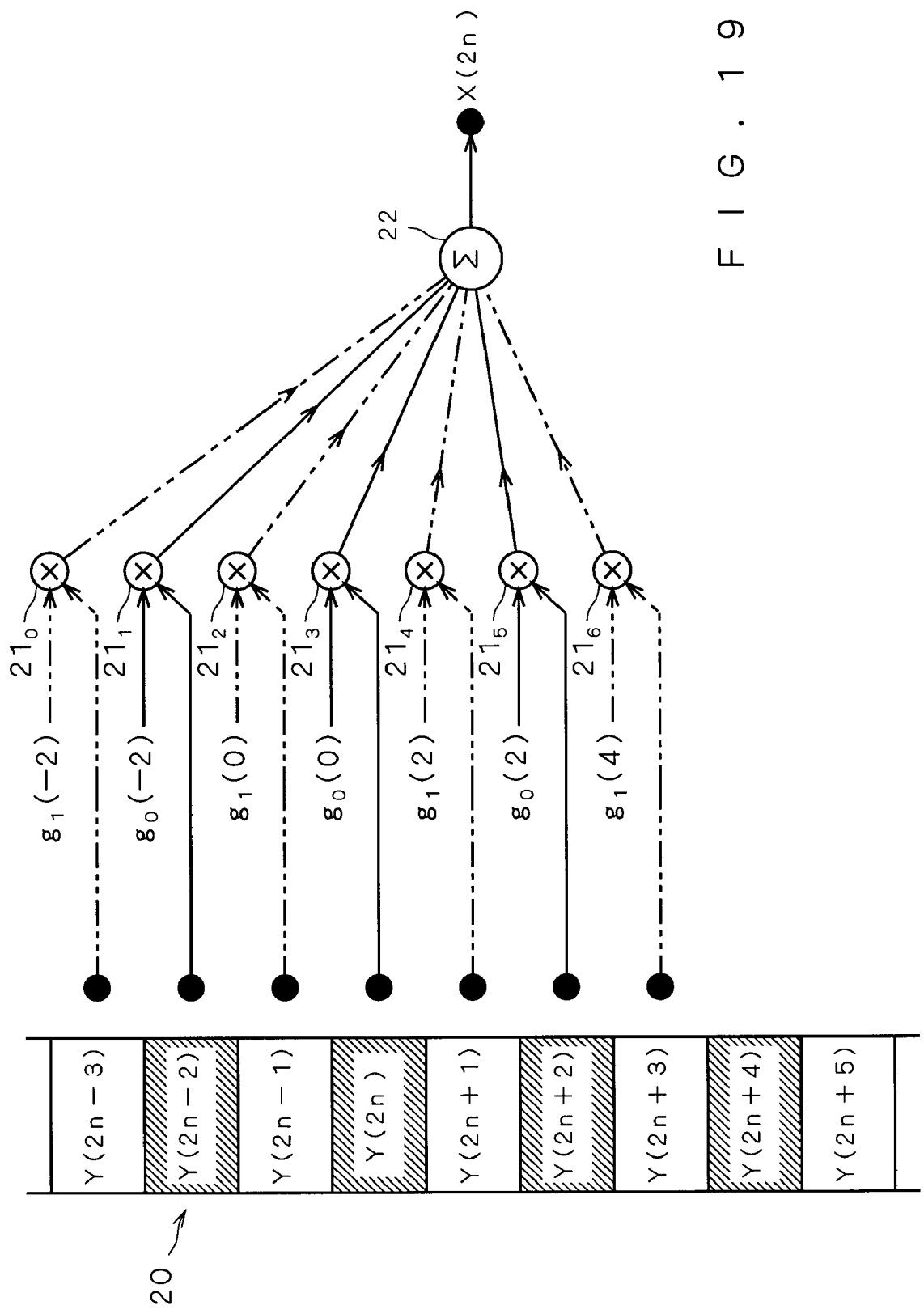
FIG. 19 is a diagram showing the configuration of a composition-side FIR-type filter.
Figure 20:
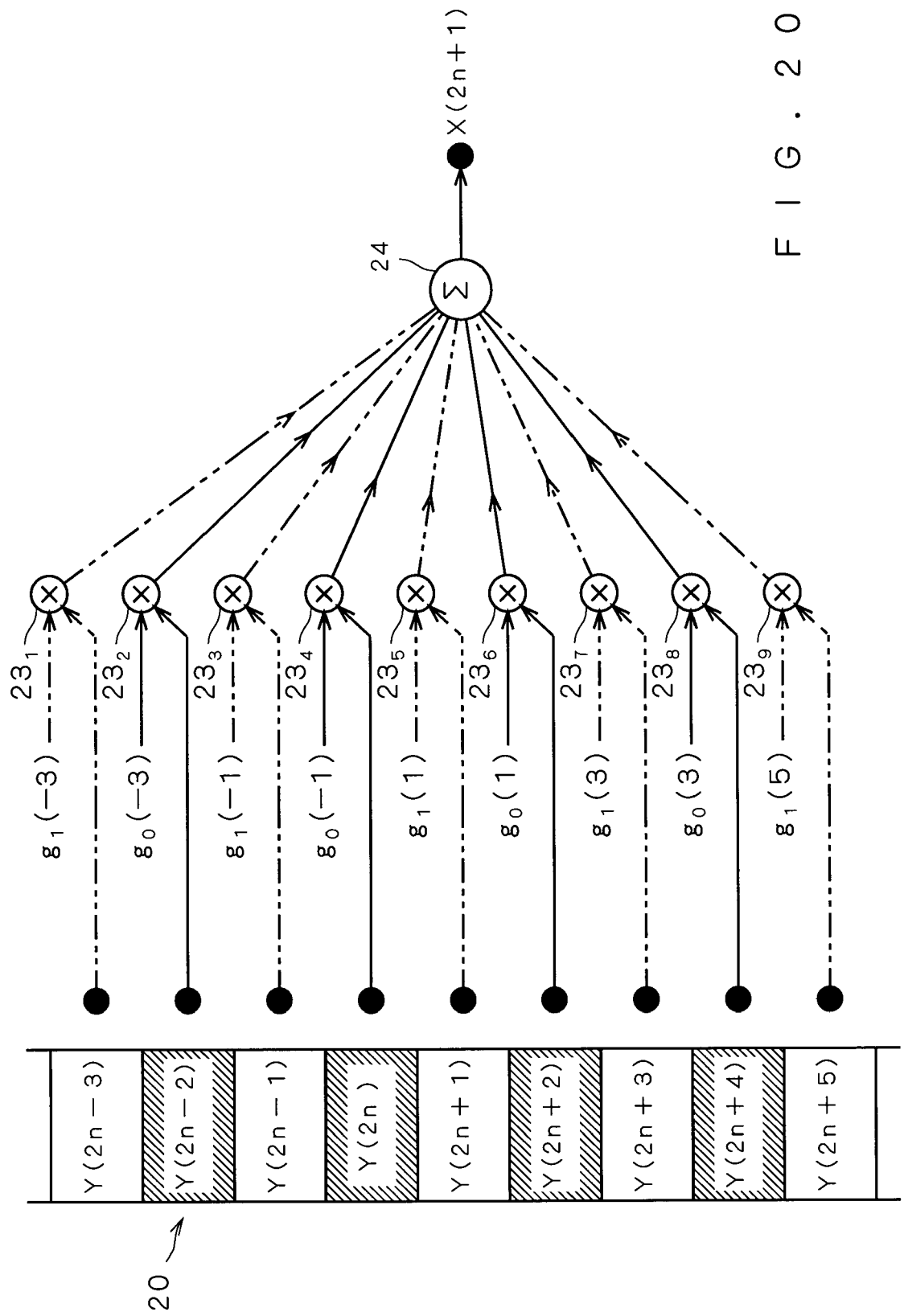
FIG. 20 is a diagram showing the configuration of the composition-side FIR-type filter.

Based on the above-described polyphase expression, an FIR filter realizing filter banks on the composition side can be configured. FIGS. 19 and 20 are schematic diagrams showing the configurations of the FIR filters on the composition side. The FIR filters simultaneously execute a filter process and an up-sampling process. To the FIR filters, data sequences . . . , Y(2n–3), Y(2n–2), . . . , Y(2n), . . . , Y(2n+4), Y(2n+5), . . . constructing a DWT image 20 are input.

The FIR filter of 7 taps shown in FIG. 19 uses filter factors $g_0(-2)$, $g_0(0)$, $g_0(2)$, $g_1(-2)$, $g_1(0)$, $g_1(2)$, and $g_1(4)$ of the polyphase filters $R_0(z^2)$ and $K_0(z^2)$ and has multipliers 21₀, 21₁, . . . , 21₆ for convoluting the filter factors and the input data sequences and an adder-subtractor 22. The FIR filter executes the convolution in accordance with the following equation (5) to obtain even-numbered data X(2n). The equation (5) will be called an even-numbered filter. The variable Y(2n+2k) of the first term of the right side of the equation (5) of the even-numbered filter is an input of the low-pass filter. The variable Y(2n+2k–1) of the second term of the right side of the equation (5) of the even-numbered filter is an input of the high-pass filter.

$$X(2n) = \sum_{k=-1}^{1} Y(2n+2k)g_0(2k) + \sum_{k=-1}^{2} Y(2n+2k-1)g_1(2k) \quad (5)$$

The FIR filter of 9 taps shown in FIG. 20 uses filter factors $g_0(-3)$, $g_0(-1)$, $g_0(1)$, $g_0(3)$, $g_1(-3)$, $g_1(-1)$, $g_1(1)$, $g_1(3)$, and $g_1(5)$ of the polyphase filters $R_1(z^2)$ and $K_1(z^2)$ and has multipliers 23₁, 23₂, . . . , 23₉ for convoluting the filter factors and the input data sequences and an adder 24. The FIR filter executes the convolution in accordance with the following equation (6) to obtain odd-numbered data X(2n+1). The equation (6) will be called an odd-numbered filter. The variable Y(2n+2k) of the first term of the right side of the equation (6) of the odd-numbered filter is an input of the low-pass filter. The variable Y(2n+2k+1) of the second term of the right side of the equation (6) of the odd-numbered filter is an input of the high-pass filter.

$$X(2n+1) = \sum_{k=-1}^{2} Y(2n+2k)g_0(2k-1) + \sum_{k=-2}^{2} Y(2n+2k+1)g_1(2k+1) \quad (6)$$

The following table 2 shows filter factors $<g_0(n)>$ and $<g_1(n)>$ of a Daubechies filter.

TABLE 2

| Composition-side filter factors of Daubechies filter of 9 × 7 taps | | | |
|---|---|---|---|
| n | $<g_0(n)>$ | n | $<g_1(n)>$ |
| 0 | +1.115087052457000 | –1 | +0.602949018236360 |
| ±1 | +0.591271763114250 | 0, 2 | –0.266864118442875 |
| ±2 | –0.057543526228500 | –1, 3 | –0.078223266528990 |
| ±3 | –0.091271763114250 | –2, 4 | +0.016864118442875 |
| | | –3, 5 | +0.026748757410810 |

The inverse DWT (composition side) used in Part 1 of JPEG 2000 has the following rules.

In the 9×7 tap filter, an even-numbered input is made of 7 pixels, and an odd-numbered input is made of 9 pixels.

In Part 1 Profile 0, the upper left corner of each sub band is used as the origin, so that the first input is always a low-pass output.

Figure 21A:
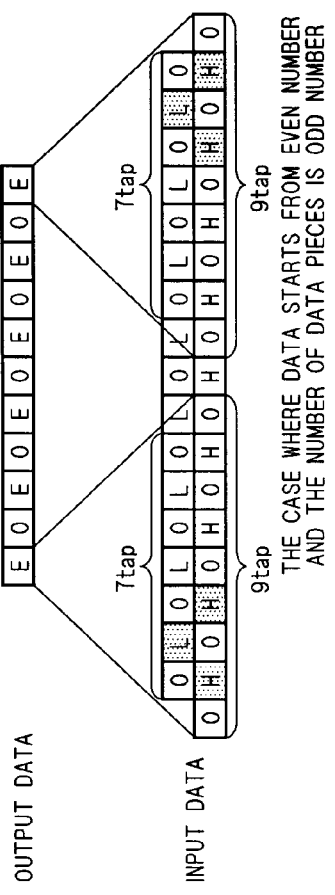
FIGS. 21A to 21D are diagrams showing positional relations of input/output data in the case where reverse DWT is executed by using a filter of 9×7 taps.
Figure 21B:
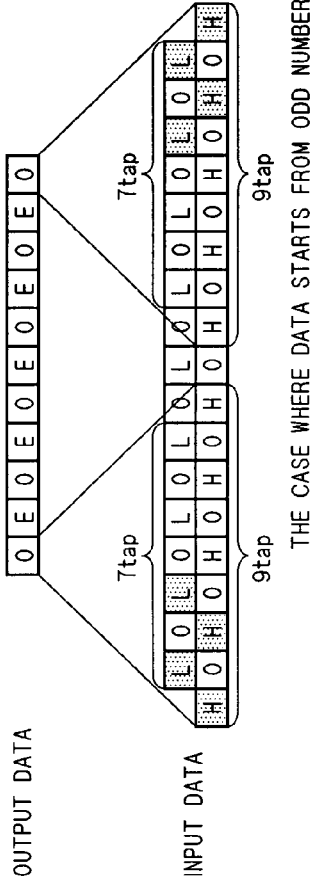
Figure 21C:
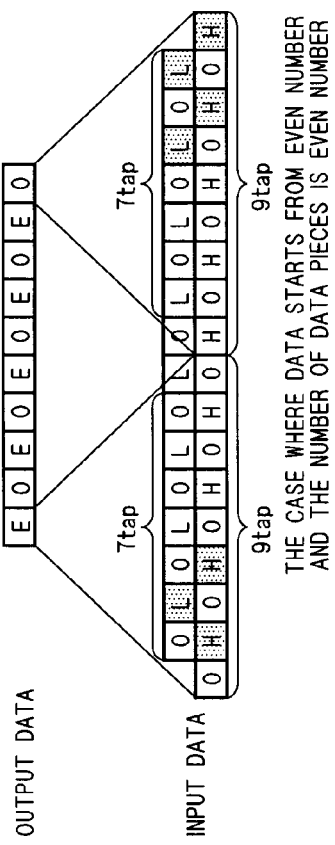
Figure 21D:
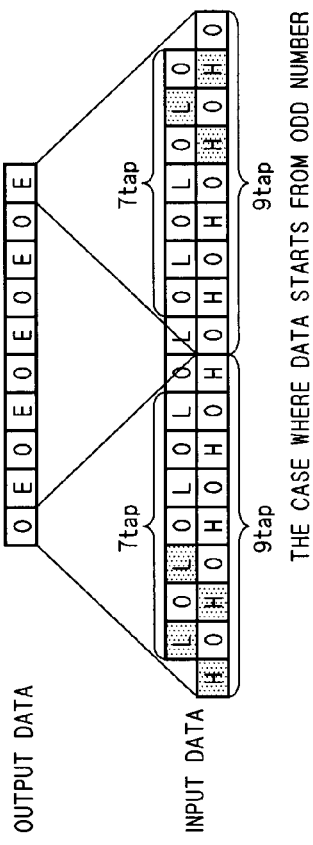

Next, the number of pieces of data to be excessively read to the inverse DWT unit 413 in order to execute inverse DWT will be considered. FIGS. 21A to 21D are diagrams showing positional relations of input/output data in the case of executing the inverse DWT by using a filter of 9×7 taps. FIG. 21A shows a case where a target data sequence starts from even-numbered data (low-pass data L) and the number of data pieces is an even number. FIG. 21B shows a case where a target data sequence starts from even-numbered data (low-pass data L) and the number of data pieces is an odd number. FIG. 21C shows a case where a target data sequence starts from odd-numbered data (high-pass data H) and the number of data pieces is an even number. FIG. 21D shows a case where a target data sequence starts from odd-numbered data (high-pass data H) and the number of data pieces is an odd number. In the case of using a filter of 9×7 taps, four patterns shown in FIGS. 21A to 21D are considered by combinations of odd-number and even-number of start data and odd-number and even-number as the number of data pieces. In Part 1 Profile 0, even-numbered data is always start data. Consequently, only the cases of FIGS. 21A and 21B are possible.

In the case of combining even-numbered pixels, a 7-tap filter is used. In the case of combining odd-numbered pixels, a 9-tap filter is used.

According to the JPEG2000 system, in the inverse DWT, the order of processes is determined in such a manner that, first, a synthetic horizontal filter is applied and then a synthetic vertical filter is applied.

Figure 22:
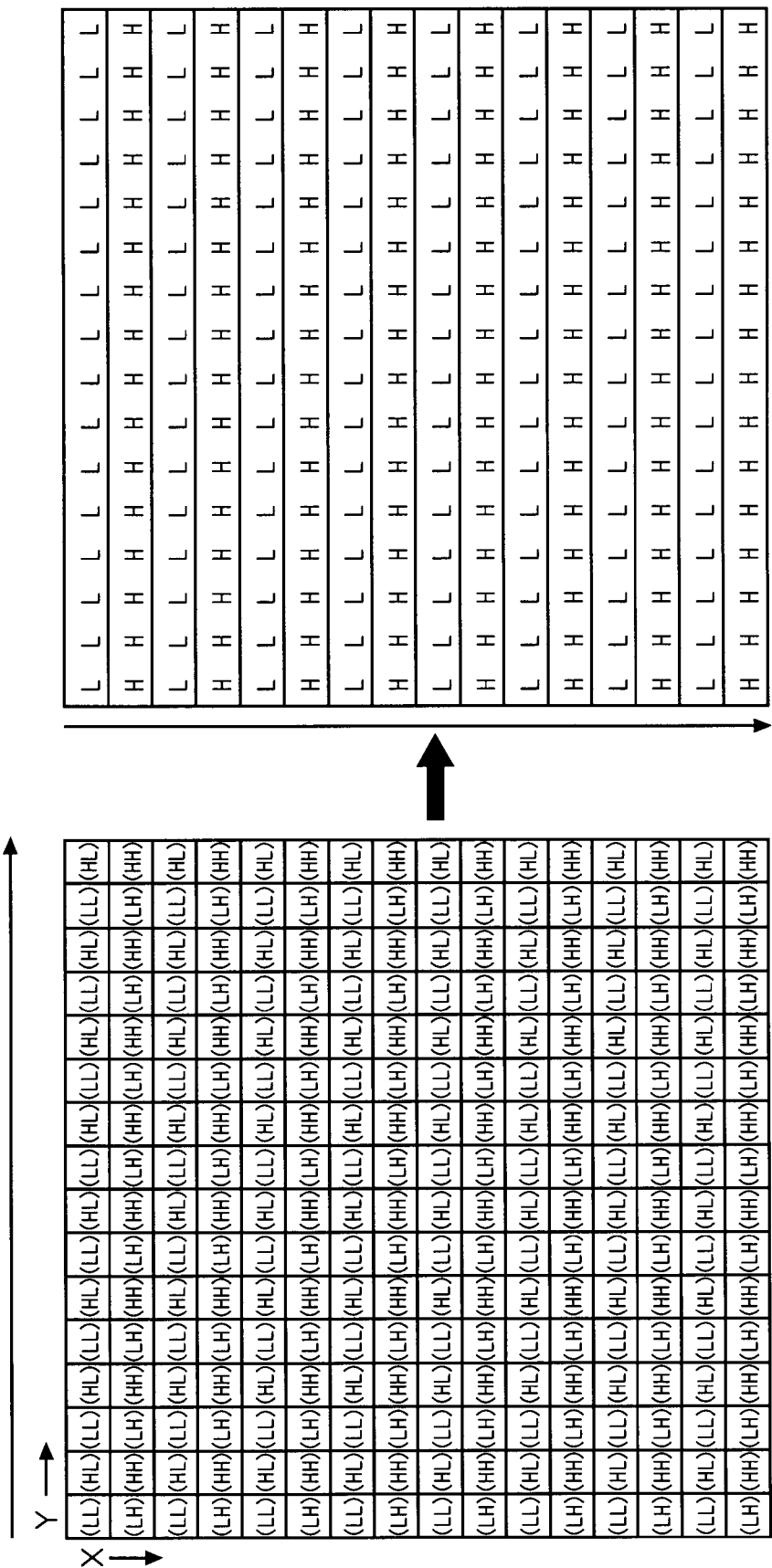
FIG. 22 is a diagram showing a state where image signals of 16 rows by 16 columns are subjected to a two-dimensional filter in accordance with the order of a synthetic horizontal filter and a synthetic vertical filter.

FIG. 22 is a diagram showing a state where a two-dimensional filter is applied on image signals of 16 rows (from the $0^{th}$ row to the $15^{th}$ row) by 16 columns (from the $0^{th}$ column to the $15^{th}$ column) in order of a synthetic horizontal filter and a synthetic vertical filter. The left part of FIG. 22 shows a state before the synthetic horizontal filter is applied. The right part shows a state after the synthetic horizontal filter is applied.

In the left part of FIG. 22, (LL) denotes both of the horizontal and vertical components are L, (HL) denotes that the horizontal component is H and the vertical component is L, (LH) denotes that the horizontal component is L and the vertical component is H, and (HH) indicates that both of the horizontal and vertical components are H. The arrow X indicates the vertical direction, and the arrow Y expresses the horizontal direction.

As shown in the right part of FIG. 22, by applying the synthetic horizontal filter, even-numbered rows become low-pass data L, and odd-numbered rows become high-pass data H.

Next, the case where the offset values $X0_{siz}$ and $Y0_{siz}$ are set to arbitrary values will be examined. For simplicity of explanation, the case where DWT is executed only once is assumed.

In the case where the offset values $X0_{siz}$ and $Y0_{siz}$ are even numbers and the number of pieces of data is an even number, the relations of even and odd numbers of input data are as shown in (a) in FIG. 21. Therefore, in this case, the execution order of filters is the even-numbered filter, the odd-numbered filter, the even-numbered filter, . . . , and the odd-numbered filter. In the case where the offset values $X0_{siz}$ and $Y0_{siz}$ are even numbers and the number of pieces of data is an odd number, the relations of even and odd numbers of input data are as shown in (b) in FIG. 21. Therefore, in this case, the execution order of filters is the even-numbered filter, the odd-numbered filter, the even-numbered filter, . . . , and the even-numbered filter.

In the case where the offset values $X0_{siz}$ and $Y0_{siz}$ are odd numbers and the number of pieces of data is an even number, the relations of even and odd numbers of input data are as shown in (c) in FIG. 21. Therefore, in this case, the execution order of filters is the odd-numbered filter, the even-numbered filter, the odd-numbered filter, . . . , and the even-numbered filter. In the case where the offset values $X0_{siz}$ and $Y0_{siz}$ are odd numbers and the number of pieces of data is an odd number, the relations of even and odd numbers of input data are as shown in (d) in FIG. 21. Therefore, in this case, the execution order of filters is the odd-numbered filter, the even-numbered filter, the odd-numbered filter, . . . , and the odd-numbered filter.

As described above, in the case where the offset values $X0_{siz}$ and $Y0_{siz}$ are set to arbitrary values, the execution order of the even-numbered filter and the odd-numbered filter of each of the horizontal and vertical filters has to be changed in accordance with the even/odd numbers of the offset values $X0_{siz}$ and $Y0_{siz}$ and the even/odd numbers of the data pieces. From the equation (5) of the even-numbered filter and the equation (6) of the odd-numbered filter, a change in the execution order of the even-numbered filter and the odd-numbered filter denotes a change in the execution order of the low-pass filter and the high-pass filter.

The configuration and operation of the inverse DWT unit 413 will be described in more detail hereinbelow. The processes of line-based inverse-wavelet transform as one of two-dimensional inverse-wavelet transforms will be described.

Figure 23:
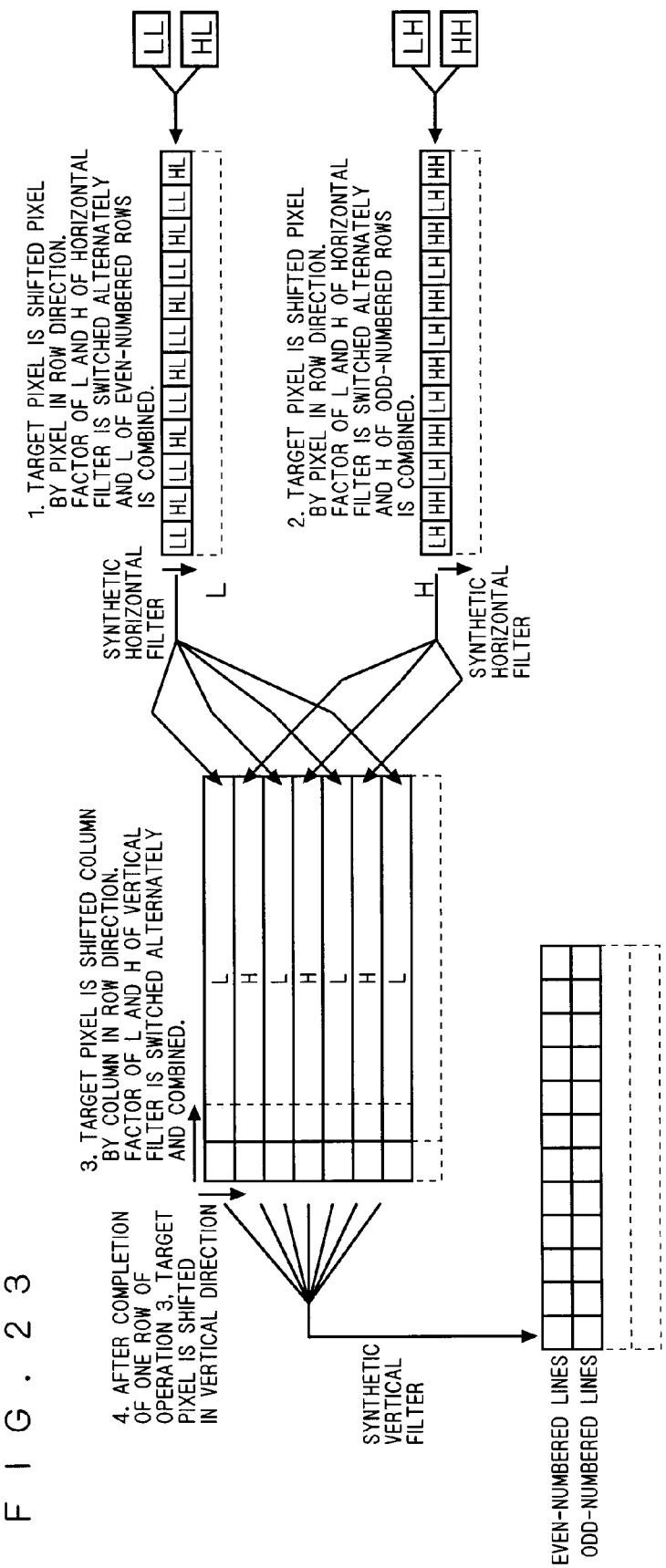
FIG. 23 is a diagram showing an outline of the configuration of a reverse DWT unit realizing line-based inverse wavelet transform.

FIG. 23 is a diagram showing an outline of the configuration of the inverse DWT unit 413 realizing the line-based inverse-wavelet transform. In the configuration, one synthetic vertical filter is disposed after two synthetic horizontal filters.

With reference to FIG. 23, first, filter processes with a synthetic horizontal filter for even-numbered lines and a synthetic horizontal filter for odd-numbered lines in the horizontal direction are performed. A target pixel is shifted one by one in the row direction. The factor of the synthetic horizontal filter is alternately switched between L and H pixel by pixel in accordance with the even/odd numbers of the offset value $X0_{siz}$. After process of one row, the target pixel is shifted by one row in the vertical direction, and similar process is repeated. After outputs of the synthetic horizontal filter are accumulated by the amount of the rows of the synthetic vertical filter, a filtering process by the synthetic vertical filter is performed. A target row is shifted one by one in the row direction. After completion of processes of one row, the target row is shifted by one in the vertical direction. The factor of the synthetic vertical filter is L or H in the same row in accordance with the even/odd numbers of the offset value $Y0_{siz}$, and L and H are switched alternately row by row.

FIG. 24 is a block diagram showing a concrete configuration of the inverse DWT unit 413 realizing the line-based wavelet transform. As shown in FIG. 24, the inverse DWT unit 413 includes an order control unit 4132, selectors 41313 to 41317, a vertical line memory 4133, a vertical even-numbered filter 4134, a vertical odd-numbered filter 4135, horizontal shift registers 4137 and 41310, horizontal even-numbered filters 4136 and 4139, horizontal odd-numbered filters 4138 and 41311, and a storing device 41312.

To the order control unit 4132, the reference grid information GD is input from the bit stream analyzing unit 423 shown in FIG. 12. The order control unit 4132 generates control signals CW1 to CW3 on the basis of the reference grid information GD and outputs the control signals CW1 to CW3. The control signal CW1 is a signal for controlling the execution order of the vertical even-numbered filter 4134 and the vertical odd-numbered filter 4135. The control signal CW2 is a signal for controlling the execution order of the horizontal even-numbered filter 4136 and the horizontal odd-numbered filter 4138. The control signal CW3 is a signal for controlling the execution order of the horizontal even-numbered filter 4139 and the horizontal odd-numbered filter 41311.

To the storing device 41312, the transform coefficient WD is input from the inverse quantization unit 414 shown in FIG. 12. The transform coefficient WD includes data LL, HL, LH, and HH. To the storing device 41312, data LL recursively generated by inverse DWT and output from the selector 41317 is input.

To the selector 41313, the data LL and HL is supplied from the storing device 41312. To the selector 41313, the data LL included in the transform coefficient WD is input in the inverse DWT of the first time, and the data LL supplied from the selector 41317 to the storing device 41312 is input in the inverse DWT of the second and subsequent times. The selector 41313 alternately selects the data LL and data HL, thereby generating data DL.

Similarly, the data LH and HH is input from the storing device 41312 to the selector 41314. The selector 41314 alternately selects the data LH and HH, thereby generating data DH.

To the horizontal shift register 4137, the data DL is input from the selector 41313, and the control signal CW2 is input from the order control unit 4132. On the basis of the data DL, the horizontal shift register 4137 supplies data DL1 to the horizontal even-numbered filter 4136 and supplies data DL2 to the horizontal odd-numbered filter 4138. At that time, on the basis of the control signal CW2, the output order of the data DL1 and DL2 is controlled. Concretely, when the offset value $X0_{siz}$ is an even number, the data is output in order of DL1, DL2, DL1, DL2, . . . . On the other hand, when the offset value $X0_{siz}$ is an odd number, the data is output in order of DL2, DL1, DL2, DL1, . . . . DL1 corresponds to a variable low-pass component $Y(2n+2k)$ of the first term of the right side of the equation (5) of the even-numbered filter and a variable high-pass component $Y(2n+2k-1)$ of the second term of the right side. DL2 corresponds to a variable low-pass component $Y(2n+2k)$ of the first term of the right side of the equation (6) of the odd-numbered filter and a variable high-pass component $Y(2n+2k+1)$ of the second term of the right side.

The horizontal even-numbered filter 4136 performs a process of combining a horizontal L component to the data DL1 input from the horizontal shift register 4137 and outputs data DL3. The horizontal odd-numbered filter 4138 performs a process of combining a horizontal H component to the data DL2 input from the horizontal shift register 4137 and outputs data DL4.

To the horizontal shift register 41310, data DH is input from the selector 41314, and the control signal CW3 is input from the order control unit 4132. On the basis of the data DH, the horizontal shift register 41310 inputs data DH1 to the horizontal even-numbered filter 4139 and inputs data DH2 to the horizontal even-numbered filter 41311. At that time, on the basis of the control signal CW3, the output order of the data DH1 and DH2 is controlled. Concretely, when the offset value $X0_{siz}$ is an even number, the data is output in order of DH1, DH2, DH1, DH2, . . . . On the other hand, when the offset value $X0_{siz}$ is an odd number, the data is output in order of DH2, DH1, DH2, DH1, . . . . DH1 corresponds to a variable low-pass component $Y(2n+2k)$ of the first term of the right side of the equation (5) of the even-numbered filter and a variable high-pass component $Y(2n+2k-1)$ of the second term of the right side. DH2 corresponds to a variable low-pass component $Y(2n+2k)$ of the first term of the right side of the equation (6) of the odd-numbered filter and a variable high-pass component $Y(2n+2k+1)$ of the second term of the right side.

The horizontal even-numbered filter 4139 performs a process of combining a horizontal L component to the data DH1 input from the horizontal shift register 41310 and outputs data DH3. The horizontal odd-numbered filter 41311 performs a process of combining a horizontal H component to the data DH2 input from the horizontal shift register 41310 and outputs data DH4.

To the selector 41315, the data DL3 is input from the horizontal even-numbered filter 4136 and the data DL4 is input from the horizontal odd-numbered filter 4138. The selector 41315 arranges the data DL3 and DL4 in a predetermined order, thereby generating data DL5.

Similarly, to the selector 41316, the data DH3 is input from the horizontal even-numbered filter 4139 and the data DH4 is input from the horizontal odd-numbered filter 41311. The selector 41316 arranges the data DH3 and DH4 in a predetermined order, thereby generating data DH5.

To the vertical line memory 4133, the data DL5 and DH5 is input from the selectors 41315 and 41316, respectively, and the control signal CW1 is input from the order control unit 4132. On the basis of the data DL5 and DH5, the vertical line memory 4133 supplies data DA1 to the vertical even-numbered filter 4134 and supplies data DA2 to the vertical odd-numbered filter 4135. At that time, on the basis of the control signal CW1, the output order of the data DA1 and DA2 is controlled. Concretely, when the offset value $Y0_{siz}$ is an even number, the data is output in order of DA1, DA2, DA1, DA2, . . . . On the other hand, when the offset value $Y0_{siz}$ is an odd number, the data is output in order of DA2, DA1, DA2, DA1, . . . . DA1 corresponds to a variable low-pass component $Y(2n+2k)$ of the first term of the right side of the equation (5) of the even-numbered filter and a variable high-pass component $Y(2n+2k-1)$ of the second term of the right side. DA2 corresponds to a variable low-pass component $Y(2n+2k)$ of the first term of the right side of the equation (6) of the odd-numbered filter and a variable high-pass component $Y(2n+2k+1)$ of the second term of the right side.

The vertical even-numbered filter 4134 generates data DA3 of a vertical even component on the basis of the data DA1 and outputs the data DA3. The vertical odd-numbered filter 4135 generates data DA4 of a vertical odd component on the basis of the data DA2 and outputs the data DA4.

To the selector 41317, the data DA3 is input from the vertical even-numbered filter 4134 and the data DA4 is input from the vertical odd-numbered filter 4135. Further, in the case where the inverse DWT has to be executed, the selector 41317 generates data LL on the basis of the data DA3 and DA4 and supplies the data LL to the storing device 41312, thereby performing the inverse DWT recursively. On the other hand, in the case where the inverse DWT does not have to be executed, the selector 41317 generates an image signal LD on the basis of the data DA3 and DA4 and outputs the image signal LD. The image signal LD is input to the tiling unit 412 shown in FIG. 12.

Effect of Image Decoding Apparatus 400

In the image decoding apparatus 400 according to the second embodiment, the order control unit 4132 of the inverse DWT unit 413 variably controls the execution order of the low-pass filter and the high-pass filter with respect to each of the vertical and horizontal filters. Therefore, the execution order of inputs of the low-pass and high-pass filters can be controlled in accordance with the designated offset values $X0_{siz}$ and $Y0_{siz}$ of the reference grid. Image signals in which the offset values $X0_{siz}$ and $Y0_{siz}$ of the reference grid are designated to arbitrary values can be decoded.

Moreover, the inverse DWT unit 413 is constructed so as to realize the line-based inverse-wavelet transformation. Consequently, as compared with a two-dimensional inverse-wavelet transformation of a type in which all of transform coefficients are stored in a memory and a vertical filter and a horizontal filter are applied in order, the storage capacity of the memory can be reduced.

While the invention has been shown and described in detail, the foregoing description is in all aspects illustrative and not restrictive. It is therefore understood that numerous modifications and variations can be devised without departing from the scope of the invention.

What is claimed is:

1. An image signal processing apparatus comprising:
    a wavelet transforming unit for generating a transform coefficient by recursively splitting image signals to a plurality of high-pass and low-pass components by wavelet transformation,
    wherein said wavelet transforming unit comprises:
        a vertical filter and a horizontal filter each having a low-pass filter and a high-pass filter; and
        a control unit, including a processor, for variably controlling an execution order of outputs of said low-pass filter and said high-pass filter in each of said vertical and horizontal filters.

2. The image signal processing apparatus according to claim 1, further comprising an image region setting unit for setting a predetermined image region on a reference grid by designating an offset value from origin of said reference grid,
    wherein said control unit receives said offset value from said image region setting unit and, on the basis of said offset value, controls the execution order of outputs of said low-pass filter and said high-pass filter.

3. An image signal processing apparatus comprising:
    an inverse wavelet transforming unit for generating an image signal by recursively combining a transform coefficient which is split to a plurality of high-pass and low-pass components by inverse wavelet transformation,
    wherein said inverse wavelet transforming unit comprises:
        a horizontal filter and a vertical filter each having a low-pass filter and a high-pass filter; and
        a control unit, including a processor, for variably controlling an execution order of inputs of said low-pass filter and said high-pass filter in each of said horizontal and vertical filters.

4. The image signal processing apparatus according to claim 3, further comprising a bit stream analyzing unit for extracting an offset value from origin of a reference grid from a bit stream of input image data,
    wherein said control unit receives said offset value from said bit stream analyzing unit and, on the basis of the offset value, controls the execution order of inputs of said low-pass filter and said high-pass filter.

5. An image signal processing apparatus comprising:
    a wavelet transforming unit for generating a transform coefficient by recursively splitting image signals to a plurality of high-pass and low-pass components by wavelet transformation, wherein at least part of operations of the wavelet transforming unit are performed by a processor,
    wherein said wavelet transforming unit comprises:
        a vertical filter and a horizontal filter each having a low-pass filter and a high-pass filter; and
        a control unit for variably controlling an execution order of outputs of said low-pass filter and said high-pass filter in each of said vertical and horizontal filters.

6. The image signal processing apparatus according to claim 5, further comprising an image region setting unit for setting a predetermined image region on a reference grid by designating an offset value from origin of said reference grid,
    wherein said control unit receives said offset value from said image region setting unit and, on the basis of said offset value, controls the execution order of outputs of said low-pass filter and said high-pass filter.

7. An image signal processing apparatus comprising:
    an inverse wavelet transforming unit for generating an image signal by recursively combining a transform coefficient which is split to a plurality of high-pass and low-pass components by inverse wavelet transformation, wherein at least part of operations of the inverse wavelet transforming unit are performed by a processor,
    wherein said inverse wavelet transforming unit comprises:
        a horizontal filter and a vertical filter each having a low-pass filter and a high-pass filter; and
        a control unit for variably controlling an execution order of inputs of said low-pass filter and said high-pass filter in each of said horizontal and vertical filters.

8. The image signal processing apparatus according to claim 7, further comprising a bit stream analyzing unit for extracting an offset value from origin of a reference grid from a bit stream of input image data,
    wherein said control unit receives said offset value from said bit stream analyzing unit and, on the basis of the offset value, controls the execution order of inputs of said low-pass filter and said high-pass filter.

* * * * *